United States Patent
Sun et al.

(10) Patent No.: US 9,581,214 B2
(45) Date of Patent: Feb. 28, 2017

(54) SEMI-ACTIVE ISOLATORS BASED ON MAGNETORHEOLOGICAL NANOCOMPOSITES

(71) Applicant: The Regents of the University of California, Oakland, CA (US)

(72) Inventors: Lizhi Sun, Irvine, CA (US); Hang Sun, Irvine, CA (US); Rui Li, Houston, TX (US)

(73) Assignee: The Regents of the University of California, Oakland, CA (US)

(*) Notice: Subject to any disclaimer, the term of this patent is extended or adjusted under 35 U.S.C. 154(b) by 26 days.

(21) Appl. No.: 14/312,559

(22) Filed: Jun. 23, 2014

(65) Prior Publication Data

US 2014/0376837 A1    Dec. 25, 2014

Related U.S. Application Data

(60) Provisional application No. 61/838,801, filed on Jun. 24, 2013.

(51) Int. Cl.
*F16F 1/36* (2006.01)
*H01F 1/44* (2006.01)
*B82Y 25/00* (2011.01)
*F16C 33/10* (2006.01)
*B82Y 30/00* (2011.01)
*F16C 32/06* (2006.01)
*F16C 33/66* (2006.01)

(52) U.S. Cl.
CPC .............. *F16F 1/361* (2013.01); *H01F 1/447* (2013.01); *B82Y 25/00* (2013.01); *B82Y 30/00* (2013.01); *F16C 32/0637* (2013.01); *F16C 33/1035* (2013.01); *F16C 33/6644* (2013.01); *F16C 2210/06* (2013.01)

(58) Field of Classification Search
CPC ....... F16F 1/361; F16F 9/535; F16C 32/0637; F16C 33/1035; F16C 33/6644; F16C 2210/06; H01F 1/447; B82Y 25/00; B82Y 30/00; Y10S 977/777
See application file for complete search history.

(56) References Cited

U.S. PATENT DOCUMENTS

| | | | | |
|---|---|---|---|---|
| 7,293,836 | B2 * | 11/2007 | Browne | B60N 2/4221 248/429 |
| 8,076,227 | B2 * | 12/2011 | Hyde | G03F 1/14 310/328 |
| 8,109,042 | B2 * | 2/2012 | McKnight | B60J 10/50 49/475.1 |
| 8,808,567 | B2 * | 8/2014 | Mazyar | H01F 1/01 252/62.52 |
| 9,129,732 | B2 * | 9/2015 | Rwei | H01F 1/445 |
| 2003/0119943 | A1 * | 6/2003 | Tucker | C09D 11/30 523/160 |
| 2005/0003289 | A1 * | 1/2005 | Fushimi | G03G 9/08755 430/108.3 |

(Continued)

*Primary Examiner* — Thomas Irvin
(74) *Attorney, Agent, or Firm* — Knobbe Martens Olson and Bear LLP

(57) ABSTRACT

Systems, devices, uses and methods relating to magnetorhological materials including carbon nanotubes, such as single-walled and multi-walled carbon nanotubes, are disclosed. Uses of magnetorheological materials such as in motion damping/vibration isolation are also disclosed.

20 Claims, 26 Drawing Sheets

(56) References Cited

U.S. PATENT DOCUMENTS

| | | | |
|---|---|---|---|
| 2005/0263359 A1* | 12/2005 | Mankame | E05B 47/0009 188/266.1 |
| 2012/0236064 A1* | 9/2012 | Iftime | C09D 11/36 347/20 |
| 2012/0237450 A1* | 9/2012 | Wheatley | A61K 49/223 424/9.5 |
| 2013/0112911 A1* | 5/2013 | Mazyar | H01F 1/01 252/62.54 |
| 2015/0014572 A1* | 1/2015 | Rwei | H01F 1/447 252/62.54 |

\* cited by examiner

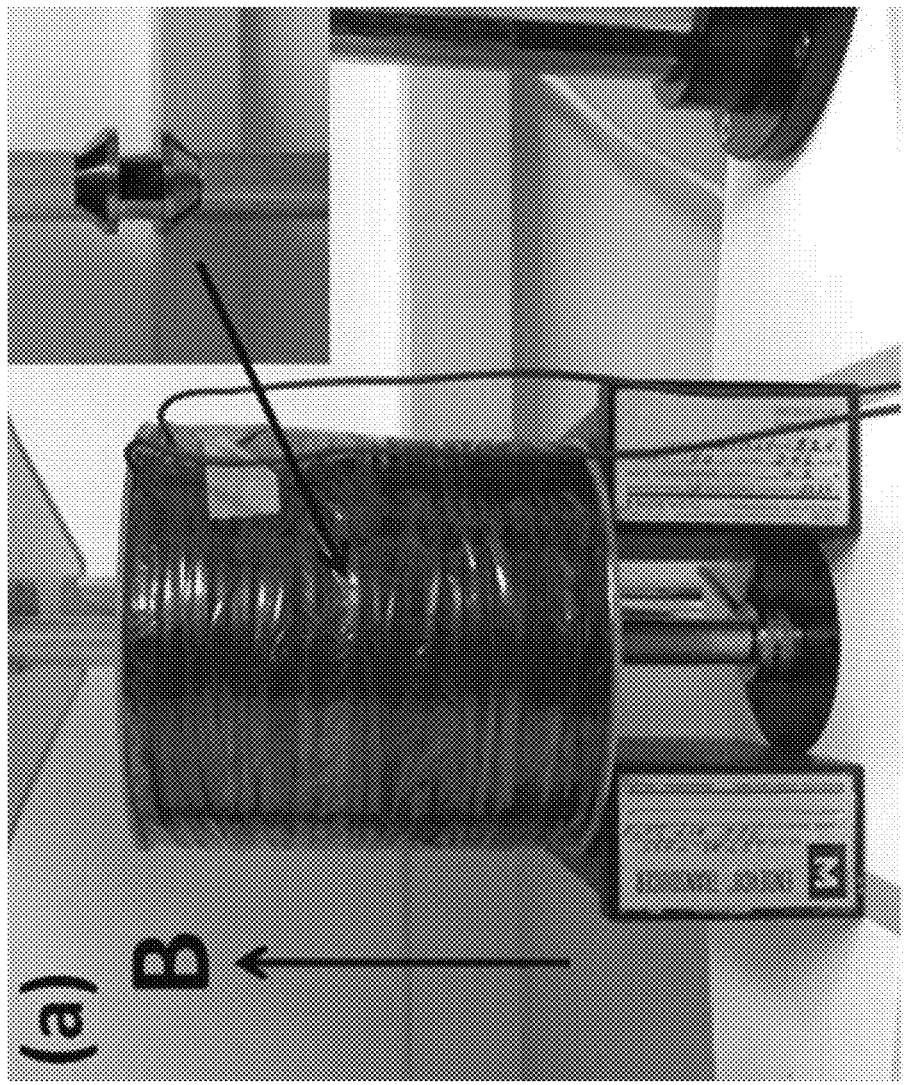

The Finite Element of the Continuous Beam

The typical Earthquake wave -- TCU120 of Chi-chi Earthquake

Dependence of longitude displacements (deflections in cm, y-axis) of the beam on the Conditions 1, 2, and 3 (x-axis). Specific three conditions are shown in Tab. 1.

Dependence of shear forces (in kN, y-axis) at the fix-end or roller-end supports (piers) on the Conditions 1, 2, and 3 (x-axis). Specific three conditions are shown in Tab. 1.

Dependence of bending moments (in kN-m, y-axis) at the fix-end or roller-end supports (piers) on the Conditions 1, 2, and 3 (x-axis). Specific three conditions are shown in Tab. 1.

SEMI-ACTIVE ISOLATORS BASED ON MAGNETORHEOLOGICAL NANOCOMPOSITES

CROSS-REFERENCE TO RELATED APPLICATIONS

This application claims the benefit of U.S. Provisional Application No. 61/838,801, filed on Jun. 24, 2013, and entitled "SEMI-ACTIVE ISOLATORS BASED ON MAGNETORHEOLOGICAL NANOCOMPOSITES", the contents of which is hereby incorporated by reference in its entirety.

STATEMENT REGARDING FEDERAL FUNDING

Embodiments of the present disclosure were made with Government Support under Grant No. CMMI-0800417 awarded by the National Science Foundation. The Government has certain rights in this invention.

TECHNICAL FIELD

This disclosure relates to motion dampers, including vibration isolators, for various uses. In particular, the motion dampers include those which utilize a magnetorheological material including carbon nanotubes. In various embodiments multiwalled carbon nanotubes can be used, and motion dampers can be used for bridges, buildings, and other structures/equipment/systems where motion damping/vibration isolation is desired.

BACKGROUND

Vibration control devices can be used in a number of areas including machinery, transportation equipment, vehicles, scientific instruments, buildings, bridges, and elsewhere.

Vibration-control devices in civil engineering applications frequently utilize rubber bearings to support service loads, and also to change the natural period of civil structures to mitigate response from the natural hazards such as earthquakes. While the internal stresses of structures can be reduced with the installation of rubber bearings, severe deformation of girders can occur during large earthquakes, especially at near-fault locations. Therefore it can be desirable to also control the structural displacements that occur during an earthquake.

Control of such structural displacements is also desirable for structures utilizing continuous beam construction. Because of the advantages of less deformation and higher degree of driving comfort, continuous beam bridges are a commonly used structure form for highway and city bridges. However, in recent history, many highly destructive earthquakes have occurred in the world, among these earthquakes are the Northridge earthquake in the US in 1994, the Kobe earthquake in Japan in 1995, the Chi-chi earthquake in Taiwan in 1999, the Wen-Chuan earthquake in China in 2008, the Haiti earthquake and Chile earthquake in 2010 which all resulted in many continuous beam bridge deformations and collapses that blocked traffic and contributed to enormous death and economic loss. For example the BaiHua Bridge in Wen-Chuan earthquake, which was very close to the causative fault (the closest point was 1.5 km from the bridge), was damaged and the damage to this bridge added great difficulty to relief efforts and resulted in secondary problems. Further, because it is unlikely that the placement of bridges near to earthquake faults can be avoided, the potential for collapse of those bridges and resulting injury and economic loss will remain. Accordingly, improved anti-earthquake capabilities of continuous bridges and improved bearing designs for continuous beam structures is desirable.

One approach to reduce the damage to continuous beam bridge caused by earthquakes includes the use of damper and lead rubber bearings. Other approaches include intelligent materials, for example magnetorheological elastomer (MREs). MREs utilize both elastomeric and magnetorheological materials and can provide advantages over magnetorheological fluids, which can have problems such as sedimentation/settling of the magnetic particles, poor service life and leakage. MREs can be used in some applications for vibration control in fields such as aerospace and mechanics.

As a kind of intelligent material, a Magneto Rheological Elastomers (MRE) can be a solid or gel matrix with magnetic particles dispersed therein, and can reform upon application of a magnetic field into a solid and ordered structure whose modulus of elasticity and other mechanical properties are significantly increased, and this reformation can be quickly completed and can have good reversibility. MREs can have the advantages of both magnetorheological materials and of elastomers and can offer advantages over magnetorheological fluids of improved suspension of the magnetic particles, stability and ease of encapsulating the magnetorheological material. As such, MREs can be used in automotive applications, such as suspension systems, motor mounts and car bumpers as well as in artificial muscle applications. MREs can also be used in the fields of Aerospace and mechanical vibration control, bionics and elsewhere. However, traditional MREs, those without added carbon nanotubes, have limited usefulness due to the basic matrix being too soft.

Magnetorheological elastomers, including those with carbon nanotubes, because of their advantages of quick response, good reversibility and frequent usability in applications where rubber bearings can be used, also have potential use as a smart bearing to reduce the effect of an earthquake. In some embodiments, an MRE with carbon nanotubes can replace the rubber portion of a isolator to make a multilayer intelligent magnetorheological elastomer isolator. For some designs, finite element analysis shows that the magnetic flux density for some embodiments of an MRE with carbon nanotubes can be up to 1.2 T and that the magnetic field can activate the magnetocaloric effect of magnetorheological elastomers.

MRE functionality and capabilities can be improved and extended with the addition of carbon nanotubes. In various embodiments, the MRE with carbon nanotubes can exhibit improved shearing stiffness and capacity for consuming energy. In addition, these properties can be adjusted by an external magnetic field.

Current technological solutions associated with rubber bearings frequently include the installation of passive fluid viscous dampers with lead cores added to the bearings. However, these techniques cannot adjust the structural responses with either active or semi-active control. While one significant function of rubber bearings is to provide support against loads, the installation of passive fluid viscous dampers does not have sufficient supporting ability for many applications. Further, in some installations, more space is required to install this type of damper which can be difficult to accommodate in an engineering design. In addition, the production of rubber bearings with lead cores is complicated, and the resulting bearings frequently cannot achieve as good of results when compared with semi-active devices because of the intrinsic mechanisms of passive energy dissipation in these devices.

Magnetorheological (MR) nanocomposites can be reinforced with carbon nanotubes, such as single-walled and/or multi-walled carbon nanotubes and in various embodiments can result in nanocomposites which can exhibit higher zero-magnetic-field stiffness, improved damping performance or higher magnetic-field-induced increases in stiffness and dampening as well as combinations of more than one of these properties, such as improved stiffness and dampening and improved stiffness, dampening and magnetic-field-induced increases in stiffness and/or dampening as compared to MR materials without carbon nanotubes.

Magnetorheological (MR) elastomers can be smart materials whose viscoelastic properties can be controlled rapidly and reversibly by applied external magnetic fields. Microstructurally, MR elastomers can be composed of an elastomeric matrix, such as a low-permeability elastomeric matrix, and ferromagnetic particle fillers, and can have anisotropic or isotropic structures and/or properties. In one approach to fabricating anisotropic MR elastomers, magnetic fields can be applied during the curing process, which can cause particles to form chain-like structures. In one approach to fabricating isotropic MR elastomers, no magnetic field is applied during the curing process, particles can be more randomly dispersed in the matrix, thus showing a more isotropic structure. When cured MR elastomers are exposed to applied magnetic fields with direction parallel to the chain-structures (when present), the magnetic interaction among the particles can induce a prompt and continuous change in their stiffness and damping, which is usually referred to as the "MR effect." In some cases, MR elastomers can operate in two modes: compression and shear. In some situations, only one of compression or shear will be present and in some situations a combination of compression and shear can be present. For some uses of anisotropic MR elastomers in compression mode, loads can be applied parallel to the chain-structures, and for some uses of anisotropic MR elastomers, such as in shear mode, the loads can be applied perpendicular to the chain-like structures.

Frequently, a prominent MR effect is desired. This desirability in some cases can reflect a wide range of adjustability of properties due to the MR effect. In various situations, the MR effect can include an absolute or a relative (as compared to the no-magnetic-field condition) changes in stiffness and/or damping, and in some situations, the MR effect can include both an absolute and a relative change in stiffness and/or damping. A simultaneously high absolute and relative MR effect can hardly be difficult to achieve because a high relative MR effect is more easily achieved with low initial (no-magnetic-field) values for MR-effected properties, and high absolute MR-effected properties are generally aided by high initial properties. Accordingly, when a certain level of initial properties is demanded, it can be advantageous to consider how to increase the absolute MR effect.

Carbon nanotubes ("CNT") can be used to reinforce matrix polymers, such as those used for MREs, and can modify various properties including stiffness, strength and/or damping properties. In some cases, CNT-reinforced composites have shown dramatic improvement in stiffness, strength, and damping properties. In some situations, however, the strain at failure can be decreased. Without wishing to be bound by theory, it is believed that the small size and high aspect ratio of CNTs leads to a dramatic increase in surface area, hence a significant volume fraction of strong interfacial region, which can result in a significant enhancement in modulus and strength for the polymer nanocomposites, even when small amounts of nanofillers/carbon nanotubes are present. It is also believed that increased damping in CNT reinforced matrix polymers is due to energy dissipation due to interfacial debonding and sliding between CNTs and the polymer matrix. It is also believed that the interfaces between magnetic particles and matrix polymer strongly influence the MR effect of MR elastomers. As such, added materials, such as carbon black added to natural-rubber-based MR elastomers can result in microstructures with better bonding between carbon nanotubes and the polymer matrix, which in some cases is believed to lead to a higher MR effect but can also result in a lower absolute value for damping.

The magnetorheological elastomers with carbon nanotubes of the present disclosure, as compared to other types of dampers, such as passive viscous dampers, rubber bearings and/or lead-core rubber bearings, conventional magnetorheological elastomers and magnetorheological fluids (MRF), can have multiple advantages including:

1. Compared to the passive viscous dampers, the magnetorheological elastomers with carbon nanotubes require less space.
2. Compared to the conventional rubber bearing and/or lead-core rubber bearing, the magnetorheological elastomers with carbon nanotubes are semi-active (controllable and on-demand).
3. Compared to the conventional magnetorheological elastomers, the magnetorheological elastomers with carbon nanotubes have higher modulus and damping ratio including when multi-walled carbon-nanotubes are used as fillers.
4. Compared to the magnetorheological fluid, the novel magnetorheological nanocomposites not only have no particle settling problems, but also have more rapid responses to the control signals.

In addition, bearings and/or dampers which utilize the magnetorheological elastomers with nanotubes disclosed herein can be designed to incorporate the functions a lock-up device and/or a shear-key.

SUMMARY

In a first embodiment disclosed herein is a magnetorheological material (MRM), the magnetorheological material comprising: a polymeric matrix; ferromagnetic particles; and carbon nanotubes.

In a second embodiment disclosed herein is a motion damper, the motion damper comprising: a base; a bearing comprising a magnetorheological material comprising carbon nanotubes, the bearing having a first end attached to said base; a coil coupled to the base and capable of controllably submitting the bearing to a magnetic field, wherein the magnetic field changes at least one viscoelastic property of a component of the bearing; and an actuator attached to a second end of the bearing.

In a third embodiment disclosed herein is a method of forming a magnetorheological material (MRM) comprising carbon nanotubes, the method comprising: mixing the carbon nanotubes in a solvent and stirring the mixture with an ultrasonic processor for a first period of time.

In a fourth embodiment disclosed herein is a method of making a magnetorheological material (MRM), the method comprising: combining ferromagnetic particles, multiwalled carbon nanotubes (MWNT) and a polymeric material or polymeric material precursor; orienting at least one of the MWNT and the ferromagnetic particles; and fusing the polymeric material or polymeric material precursor.

In a fifth embodiment disclosed herein is a motion damper comprising: a bearing comprising a magnetorheological material comprising carbon nanotubes; a first attachment point; a second attachment point; and a coil magnetically coupled to the bearing and capable of controllably submitting the bearing to a magnetic field, wherein the first and second attachment points are mechanically attached directly or indirectly to different portions of bearing.

BRIEF DESCRIPTION OF THE DRAWINGS

FIG. 3a shows the configurations for dynamic mechanical analysis of MR elastomers in compression test. Arrow indicates the direction of applied magnetic field.

DESCRIPTION

Figure 1:
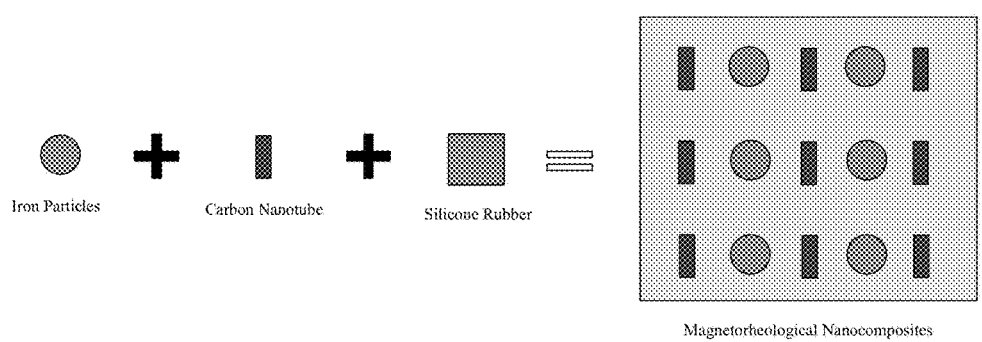
FIG. 1 is a schematic illustration of the development process of magnetorheological nanocomposites.

In the following description, numerous specific details are set forth to describe various specific embodiments disclosed herein. One skilled in the art, however, will understand that the presently described technology may be practiced without all of the specific details discussed below. In other instances, well known features have not been described so as not to obscure the invention.

Magnetorheological materials (MRM) include materials having viscoelastic properties which can be controlled by applied external magnetic fields. MRM with added carbon nanotubes, especially multiwalled carbon nanotubes (MWNT), can have improved viscoelastic properties as compared to MRM without added carbon nanotubes.

Materials

In various embodiments, MRM with carbon nanotubes can comprise a polymeric material, ferromagnetic particles, and carbon nanotubes.

In some embodiments, the polymeric material can be resilient and/or can be elastomeric or plastic. Suitable polymeric materials can include those which are thermosetting and those which are thermoplastic. Specific materials can include those which are soft polymeric materials and can include silicone, plastic polyurethane, natural rubber, polybutadiene, and the like. In some embodiments, polymeric materials having specific functional groups, such as those which influence the interface between ferromagnetic particles and polymeric matrix or the interface between carbon nanotubes and polymeric matrix can be used. In some embodiments, polymeric materials can include those having functional groups which provide particular interactions, such as attractive or repulsive interactions, with carbon nanotubes or with ferromagnetic materials, can be used. In some embodiments, combinations of all or a portion of these materials can be used.

Various types of ferromagnetic particles may be used, including those based on iron and those based on other ferromagnetic materials such as steel, nickel, cobalt, Galfenol (as well as other Fe—Ga alloys/combinations), and Terfenol-D (as well as various combinations of Fe, Tb and Dy) or other materials exhibiting ferromagnetic properties. In various embodiments, alloys or mixtures of iron or other ferromagnetic materials can be used. In some embodiments, composites of these materials can be used, such as those with layered or other types of structure.

Suitable ferromagnetic particles can have various shapes and sizes and combinations of shapes and sizes. For example, particles can be round, ellipsoidal, oblong, oblate, penny-shaped, platelet, cuboid, needles, filings, faceted, hollow, clumped, regular, irregular, etc. In some embodiments, sizes can range from about 0.5 micron to about 100 micron, and in particular embodiments, sizes can range from about 0.5 to about 20 micron or from about 20 to 40 micron or from about 40 to 60 micron, or from about 60 to 80 micron or from about 80 to 100 micron. In some embodiments, the size can range from about 3 to 30 micron or from about 10 to 60 micron or from about 20 to 100 micron. In some embodiments, the size can be presented as a weight based particle size. In some cases, ferromagnetic particles can be chosen based upon their ability to associate with carbon nanotubes, including carbon nanotubes of a particular size, shape or wall structure.

Ferromagnetic particles can be present in some embodiments at a concentration of about 0.5-5% (vol.) or about 3-5% (vol.) or about 5-10% (vol.) or about 10-20% (vol.) or about 20-25% (vol.) or about 20-30% (vol.), although in some particular embodiments, the amount of iron particles can be even higher or lower. In some embodiments, the concentration of ferromagnetic particles can be about 5% or about 10% or about 20% or about 25% or about 30% (vol.)

Suitable carbon nanotubes include those which are able to reinforce a polymeric matrix such as by stiffening the polymer or otherwise modifying the viscoelastic properties of the polymeric matrix, and those which can interact with ferromagnetic particles such as through mechanical force-dipole interaction. In some embodiments, multiwalled carbon nanotubes (MWNT) or single walled carbon nanotubes (SWNT) can be used.

Particular embodiments can utilize MWNT having two or more concentric tube structures or those having other configurations, such as a 'parchment roll' configuration, as well as combinations of various configurations. Suitable MWNT or SWNT can include those having an aspect ratio ranging from about 50 to 1000 and diameters ranging from 1 nm to 100 nm. In particular embodiments, the MWNT or SWNT can have an aspect ratio of about 50 to 200 or about 100 to 400 or about 200 to 600 or about 300 to 1000. In particular embodiments, the MWNT or SWNT can have a diameter ranging from about 1 to 10 nm, or about 10 to 50 nm or about 20 to 100 nm. In some embodiments, the aspect ratio and/or diameter are determined on a weight basis.

Carbon nanotubes can be present in some embodiments at a concentration of about 1-3.5% (wt.) or about 5-6% (wt.) or about 0.5-12% (wt.) or about 5-10% (wt.) or about 6-12% (wt.) or about 6-9% (wt.), although in particular embodiments, concentrations higher or lower can be used. In some embodiments, the carbon nanotubes can be present at a concentration of about 1%, 2%, 3%, 5%, 8%, 10% or 12% (wt.)

In some embodiments, the ferromagnetic particles can be randomly dispersed or can display an ordered structure, such as being arranged in chains. In some embodiments ferromagnetic particles can be partially randomly dispersed and partially ordered. In some embodiments carbon nanotubes can be arranged in ordered structures, such as where the longitudinal axis of the nanotubes is arranged substantially in the same direction. In some embodiments, the ferromagnetic particles and the carbon nanotubes can be associated at least in part with one another.

Properties

MRM with carbon nanotubes can include those having at least one enhanced viscoelastic property as compared to an MRM without carbon nanotubes. For example, in some embodiments, the storage shear modulus (G') can be elevated either with no magnetic field applied, or when a magnetic field is applied, or the change in storage shear modulus due to the application of a magnetic field can be increased.

In some embodiments, the storage Young's modulus (E') can be elevated either with no magnetic field applied, or when a magnetic field is applied, or the change in storage of Young's modulus due to the application of a magnetic field can be increased.

In some embodiments, the loss factor (tan δ) can be modified to increase or decrease the viscoelasticity, such as when a magnetic field is applied, or the loss factor can remain relatively constant while the storage shear modulus and/or the storage Young's modulus change.

In some embodiments, one of the storage shear modulus, storage Young's modulus, and loss factor can increase, while another one or more of these parameters can remain approximately constant or decrease upon application of a magnetic field.

In various embodiments, the viscoelastic properties can be directionally dependent, non-directionally dependent, or partially directionally dependent and partially non-directionally dependent. In some embodiments, the viscoelastic properties can be isotropic or relatively isotropic, and in some embodiments, the viscoelastic properties can be anisotropic or relatively anisotropic, depending on the microstructure of the MRM. Examples of anisotropy can include materials where the ferromagnetic particles and/or carbon nanotubes have been oriented in particular directions. In some embodiments, such anisotropy can be advantageous in particular motion dampening situations, such as where displacements occur substantially normal to the orientation of ferromagnetic particles and/or carbon nanotubes, or where at least a component of the displacement is parallel to the orientation of ferromagnetic particles and/or carbon nanotubes.

Manufacture

MRM with carbon nanotubes can be made in a number of ways, such as by polymerizing a polymeric material precursor, such as a monomer or oligomer in the presence of ferromagnetic particles and carbon nanotubes. In some embodiments, a polymeric material can be liquefied, such as by melting, or by treatment with a chemical or a solvent, adding ferromagnetic particles and carbon nanotubes, and reversing the liquefaction, such as by cooling or removing the solvent or chemical.

In some embodiments, the carbon nanotubes can be dispersed in a liquid prior to being added to the polymeric material or polymeric material precursor. In various embodiments the liquid can be a solvent, such as a solvent able to act on the polymer or polymer precursor, or a non-solvent. In some embodiments a dispersant can also be added to the liquid. Dispersing the carbon nanotubes in the liquid can also include suitable mixing methods such as ultrasonic processing, addition of shear, and various types of bulk mixing.

In some embodiments, the carbon nanotubes can be dispersed in one liquid which can then be exchanged for another liquid. If a dispersant is used, in some embodiments the dispersant can be removed by suitable processing related to the particular dispersant being used.

In some embodiments, the liquid can be an organic solvent, such as acetone, or another polar organic solvent such as 2-pyrrolidone, tetrahydrofuran, and/or or dichloromethane, or other solvents and combinations of solvents having related properties. Other solvents also can be used, such as non-polar solvents, such as toluene and hexane, and other solvents and combinations of solvents having related properties. In some embodiments, solvent(s) can be chosen based upon the solvent(s) ability to facilitate an interaction between carbon nanotubes and the polymeric matrix and/or ferromagnetic particles and the polymeric matrix.

For the manufacture of some MRM's with carbon nanotubes, it can be desirable to remove at least a portion of the liquid used to disperse the carbon nanotubes. Suitable methods include evaporation, such as by heating and/or reducing pressure, after the carbon nanotubes with liquid are mixed into the polymeric material or polymeric precursor material.

In some embodiments, processing at elevated temperature and/or reduced pressure can also be used to remove gases and voids present in the mixture.

In some embodiments, MRM with carbon nanotubes can be made by dispersing the carbon nanotubes and a liquid, such as acetone, with sonication; combining the dispersed carbon nanotubes and liquid with a polymeric material/polymeric precursor material, such as silicone rubber, with further sonication; removing the dispersing liquid by heating of the mixture and evaporating the liquid; combining the ferromagnetic particles, such as iron powder, and a curing agent (for some polymeric precursor materials) with the mixture with stirring; vacuum degassing; and pouring the mixture into molds and allowing to set.

In some embodiments, a magnetic field can be applied during processing in order to orient the ferromagnetic particles and/or carbon nanotubes. In preferred embodiments, a magnetic field sufficient to cause the magnetic particles to form chains can be used and in some embodiments, a magnetic field can be applied continuously during the setting of the polymeric material/polymeric precursor material such that the orientation remains after the magnetic field is removed.

In other embodiments, different ferromagnetic particles can be used, different dispersing liquids can be used, different methods of mixing, degassing, and liquid removal can be used and different orders of addition/different order of processing steps can also be used.

Use

In some embodiments, the MRM with carbon nanotubes, can be used to make a motion damper, such as a vibration control device, which has viscoelastic properties that can be adjusted by the application of a magnetic field. The motion damper can comprise a bearing, attachment fixtures, and a coil.

In one embodiment, the bearing can include a MRM with carbon nanotubes. In another embodiment, the MRM with carbon nanotubes can have one or more rigid bodies, such as plates of various sizes and shapes, imbedded into the MRM. The rigid bodies can be of any suitable shape, including in the form of a plate, and multiple bodies can be used, such as where a series of plates are present in the MRM and are separated, for example parallel from one another, by the MRM. In some embodiments, a series of plates can be present as a MRM-rigid body laminate, for example with at least some plates substantially parallel to one another. Suitable materials for rigid bodies include those having suitable rigidity, such as aluminum, titanium, iron, copper, steel, brass, bronze, zinc, ceramic, composites (such as carbon or glass-fiber composites), and alloys and/or combinations.

The bearing with rigid bodies can be prepared by any appropriate means, such as by molding the rigid bodies into the MRM, cutting or otherwise creating an opening in the MRM into which the rigid body is inserted, cutting the MRM and adhering rigid body to the pieces of the MRM.

In various embodiments, the attachment fixtures are configured to allow attachment of the motion damper to a first body and to a second body, so as to reduce transmission of vibration or motion from the first body to the second body, or to reduce or dissipate movement energy present in the second body that had been transferred from the first body.

Suitable configurations of attachment fixtures include those where a first attachment fixture is attached directly or indirectly to a first portion of the bearing, and the second attachment fixture is attached directly or indirectly to a second portion of the bearing. The first and second bearings can be located on opposite sides of the bearing. In some embodiments, rigid bodies can be arranged as a MRM-rigid body laminate where the first portion of the bearing is nearest to a first rigid inclusion body and furthest from a second rigid body and the second portion of the bearing is located closest to the second rigid body and furthest from a second rigid body.

In some embodiments, the first and/or second attachment fixture can include a plate, such as a steel plate.

Suitable methods of affixing the attachment fixture directly or indirectly to the bearing include the use of adhesives, welding (including metal, solvent, friction, etc.), brazing, cementing, vulcanizing, bolting, locking and any other suitable means.

Attachment fixtures can include suitable fixtures for attaching one part to another, such as by mechanical attachment and/or by utilizing friction and/or pressure, and can include, but is not limited to, plates, welding pads, flanges, pin connections, interlocking surfaces, etc.

The coil can be an electrically driven coil which imparts a magnetic field. The coil can be positioned in relation to the bearing to magnetically interact with the MRM with carbon nanotubes so as to change at least one viscoelastic parameter of the MRM with carbon nanotubes. In some embodiments, the coil can be positioned so as to completely or partially surround the bearing. In some embodiments, a support piece can be attached to a plate which is directly or indirectly attached to one side of the bearing, such as by being a part of the first or second attachment fixture, and the coil can be attached to the support piece. In some embodiments the coil, support piece and bearing form a three-part concentric structure with the coil the outermost part and the bearing the innermost part.

In some embodiments, provision is made for allowing relative movement between one of the first and second attachment fixtures and the coil and support piece. Such provision can be made by way of a gap, a flexible connection, or other suitable means or combination of means.

Operation

In various embodiments, a controller can be provided which provides a constant or variable signal used to control the magnetic field of the coil which modifies the viscoelastic properties of the bearing. In some embodiments, a motion sensor, such as an accelerometer, proximity switch, strain gauge or other suitable sensor(s) for detecting motion of the first and/or second body and/or the motion of the damper, can be utilized to send a signal to the controller, and the controller varies the signal used to control the magnetic field of the coil on the basis of the signal from the sensor(s).

Implementation

In various embodiments, the motion damper can be used to isolate motion or vibration from one body to another. Isolating motion or vibration can include completely eliminating the transmission of such motion or vibration, or it can include the reduction of the transmission of such motion or vibration.

In some embodiments, the motion damper can be used to or to reduce or dissipate movement energy present in the second body that had been transferred from the first body.

In some embodiments, the motion damper can be used to reduce or control internal stresses of the superstructure or substructure of building, bridges and the like.

Suitable applications include bridges and buildings, such as to reduce vibrations from vehicle traffic or wind or from earthquakes. For such uses, one embodiment includes the positioning of motion damper(s) between the superstructure and the foundation or piers.

Additional uses include those in the fields of mechanical, machinery, aerospace, rail and automotive industries. It can also reduce the mechanical vibration of vehicles, such as vibration associated with machinery on vehicles, including vibration of electrical machinery on vehicle structures. Particular embodiments can also be used on rail equipment, such as trains, train locomotives, and train cars as well as on the rails themselves and supports, bridges, etc. for the rails, including for high-speed rail applications.

EXAMPLES

Example 1

Fabrication of a MR Nanocomposite Utilizing Silicone Rubber

A MR nanocomposite was made following the three steps: (1) dispersion of MWNTs in a liquid-state silicone rubber; (2) dispersion of magnetic particles in the suspension of MWNTs and silicone rubber; and (3) curing of the mixture under a steady magnetic field. This process is shown diagrammatically in FIG. 1. Raw materials used for fabrication included matrix silicone rubber (Silastic® T-2 RTV silicone rubber, base and curing agent, by Dow Corning Corporation), magnetic particles (iron powders with average diameter below 15 μm and 99.9 wt % purity, by CERAC, Inc.), and MWNTs (diameter range 20-40 nm and length range 10-30 μm, 95 wt % purity, by Cheap Tubes Inc.).

MR nanocomposites with 1 wt % and 3.5 wt % of MWNTs in the matrix and 10 vol % and 20 vol % of iron particles, respectively, were fabricated. The carbon nanotubes were dispersed by mixing with sonication as follows. Firstly one part of MWNTs were incorporated into 1000 parts of acetone and stirred for two hours with an ultrasonic processor (Sonics® VCX750) to break apart the Van der Waals bonds which make the MWNTs agglomerate into bundles. Then the silicone rubber base was poured into the solution, followed by another one hour of sonication. After accelerated evaporation of acetone using a hot plate (Cimarec® SP131325Q), iron powders and curing agent were added into the mixture, followed by 10 minutes of stirring with a high-speed stirrer (Caframo® BDC3030). The new mixture was vacuum degassed for 30 minutes to eliminate air voids. Finally, the mixture was poured into plastic molds and sealed. Each mold was placed between two permanent NdFeB magnets to have the iron particles aligned in chains. The flux density of the curing magnetic field is measured as 0.5 Tesla. The MR nanocomposites were fully cured in three days. For comparison purpose, conventional MR elastomers with 10 vol % and 20 vol % of iron particles were also fabricated in a similar manner.

Figure 2A:
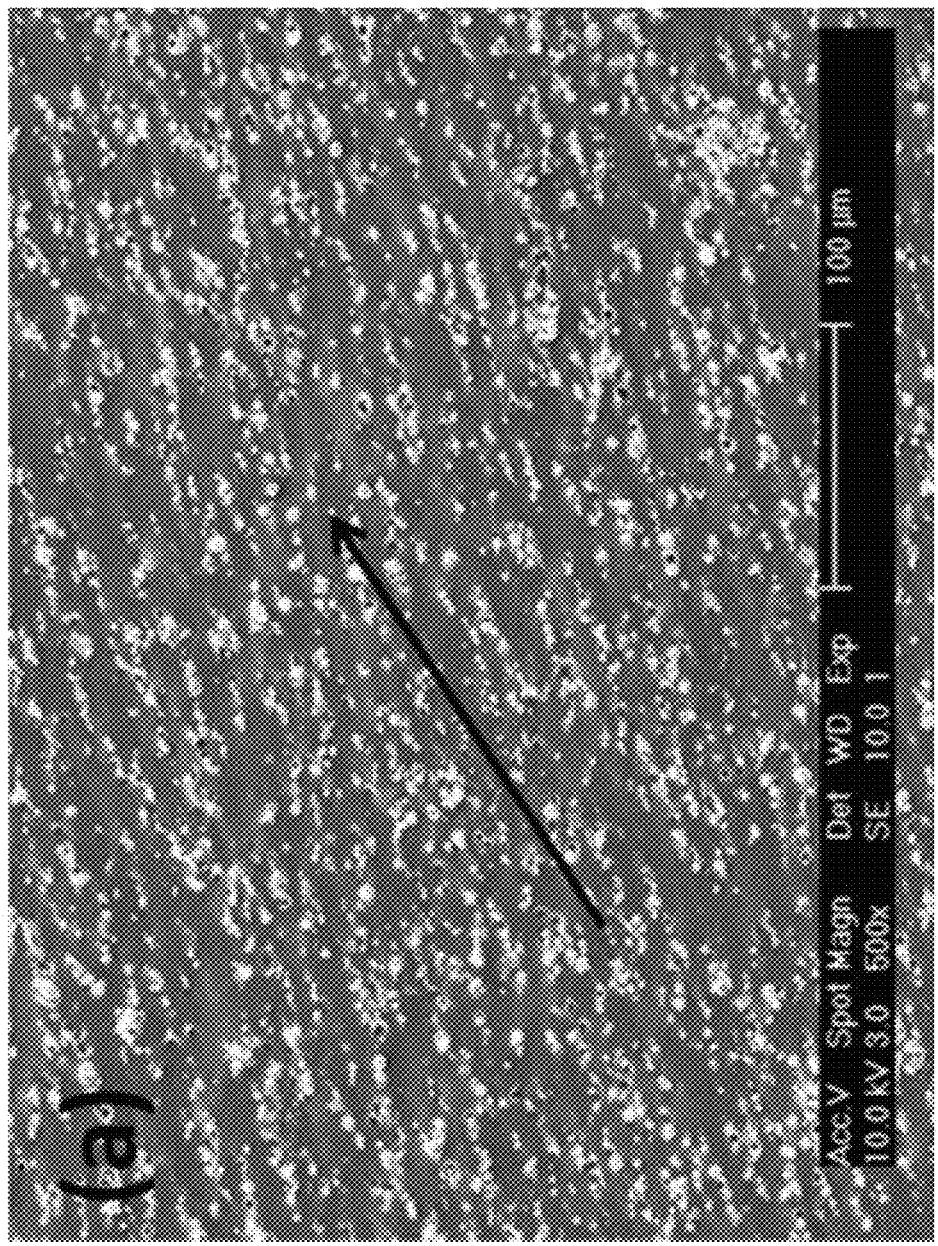
FIG. 2a shows the Microstructure of MR elastomer by scanning electron microscope. Arrow indicates the direction of iron particle chains.
Figure 2B:
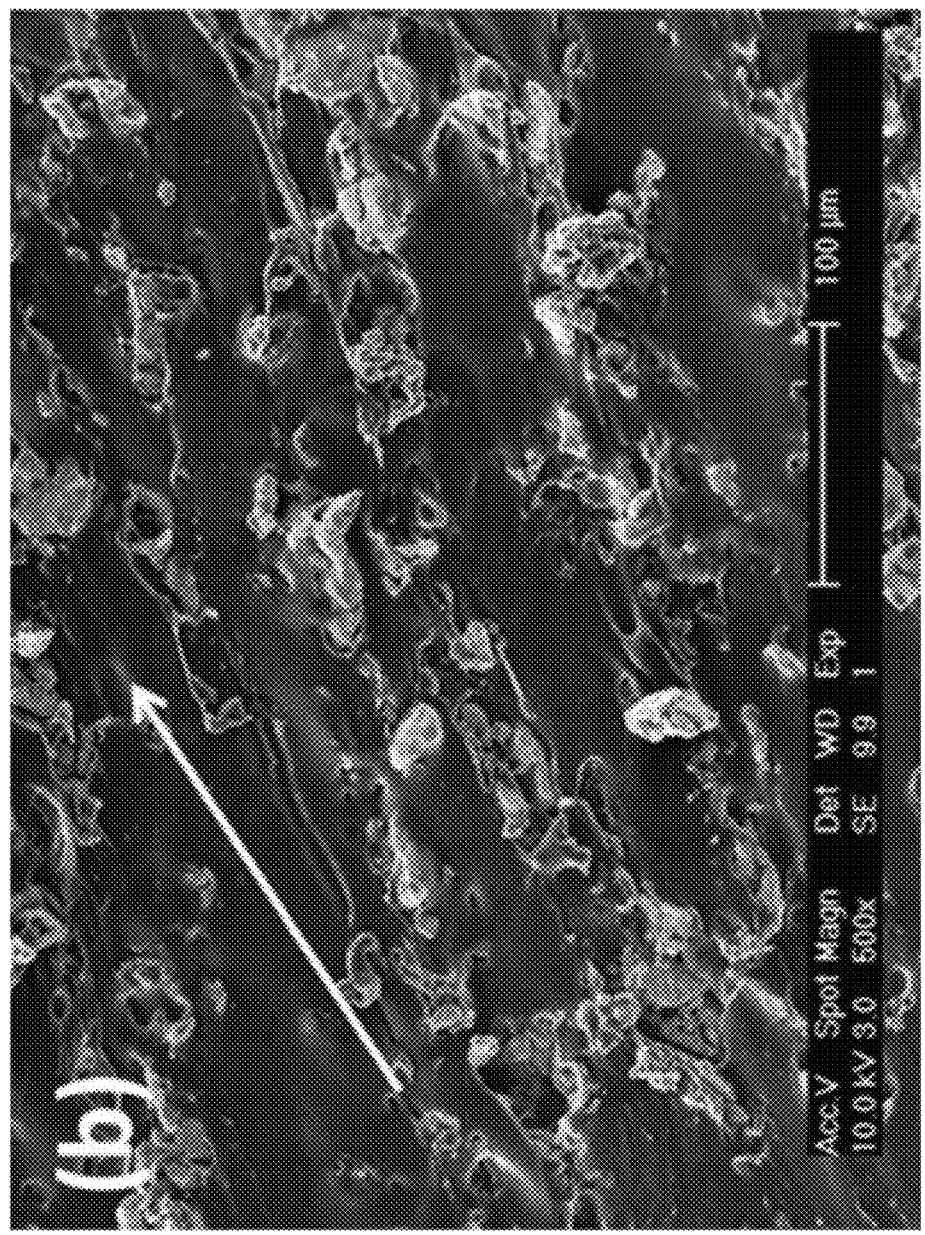
FIG. 2b shows the Microstructure of MR nanocomposite by scanning electron microscope. Arrow indicates the direction of iron particle chains.

Circular samples that were 10 mm in diameter and 9.5 mm in height (ASTM D5992, 1996) as well as rectangular samples that were 25.4 mm by 12.7 mm by 3.175 mm thick (ASTM D4896, 2001) were prepared for compression and single-lap shear tests, respectively. FIGS. 2a and b illustrate microstructures of the conventional MR elastomers and MR nanocomposites observed from scanning electron microscope (SEM). The absence of big clusters indicates good distribution of MWNTs. In addition, when MWNTs are added, it can be seen that iron particles are wrapped by a layer of nanocomposites, which forms an interface with distinct bonding condition between iron particles and matrix.

Figure 3B:
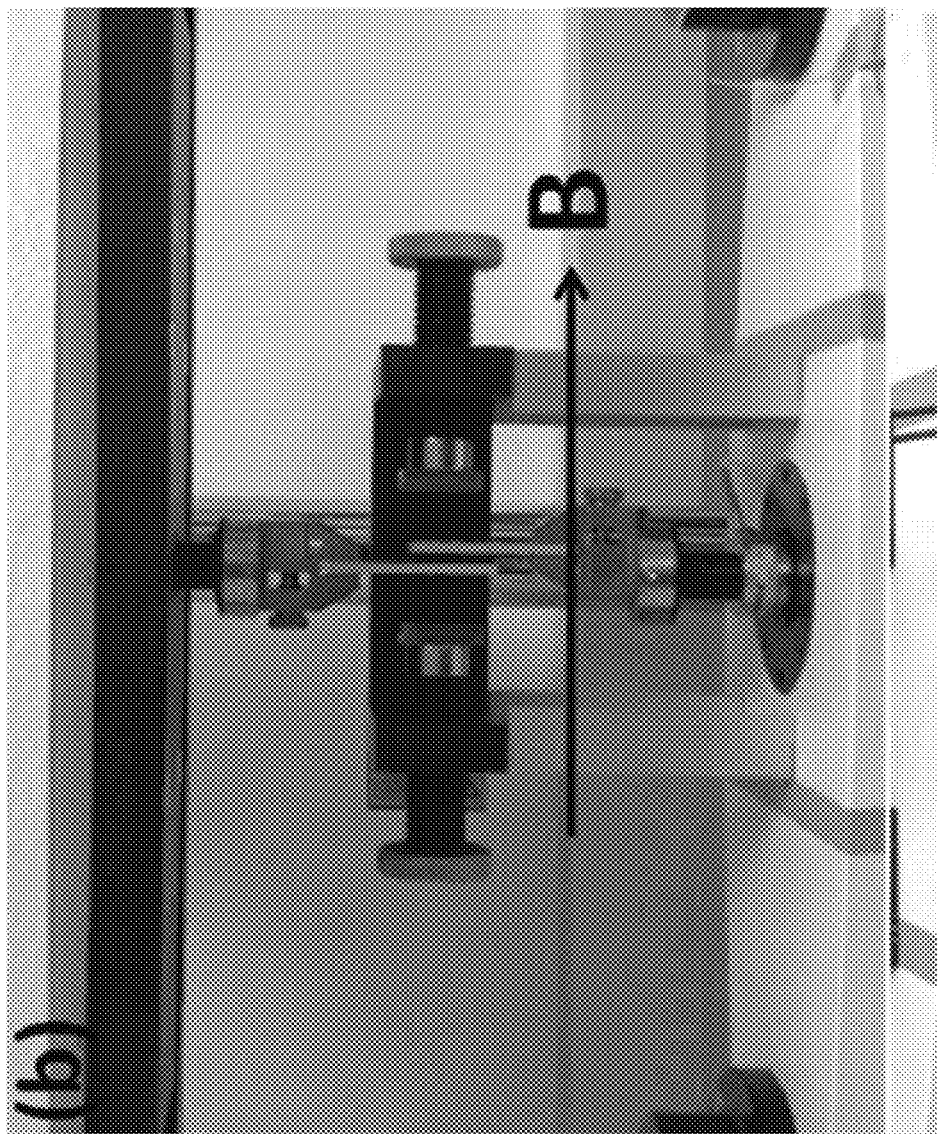
FIG. 3b shows the configurations for dynamic mechanical analysis of MR elastomers in shear test. Arrow indicates the direction of applied magnetic field.
Figure 4A:
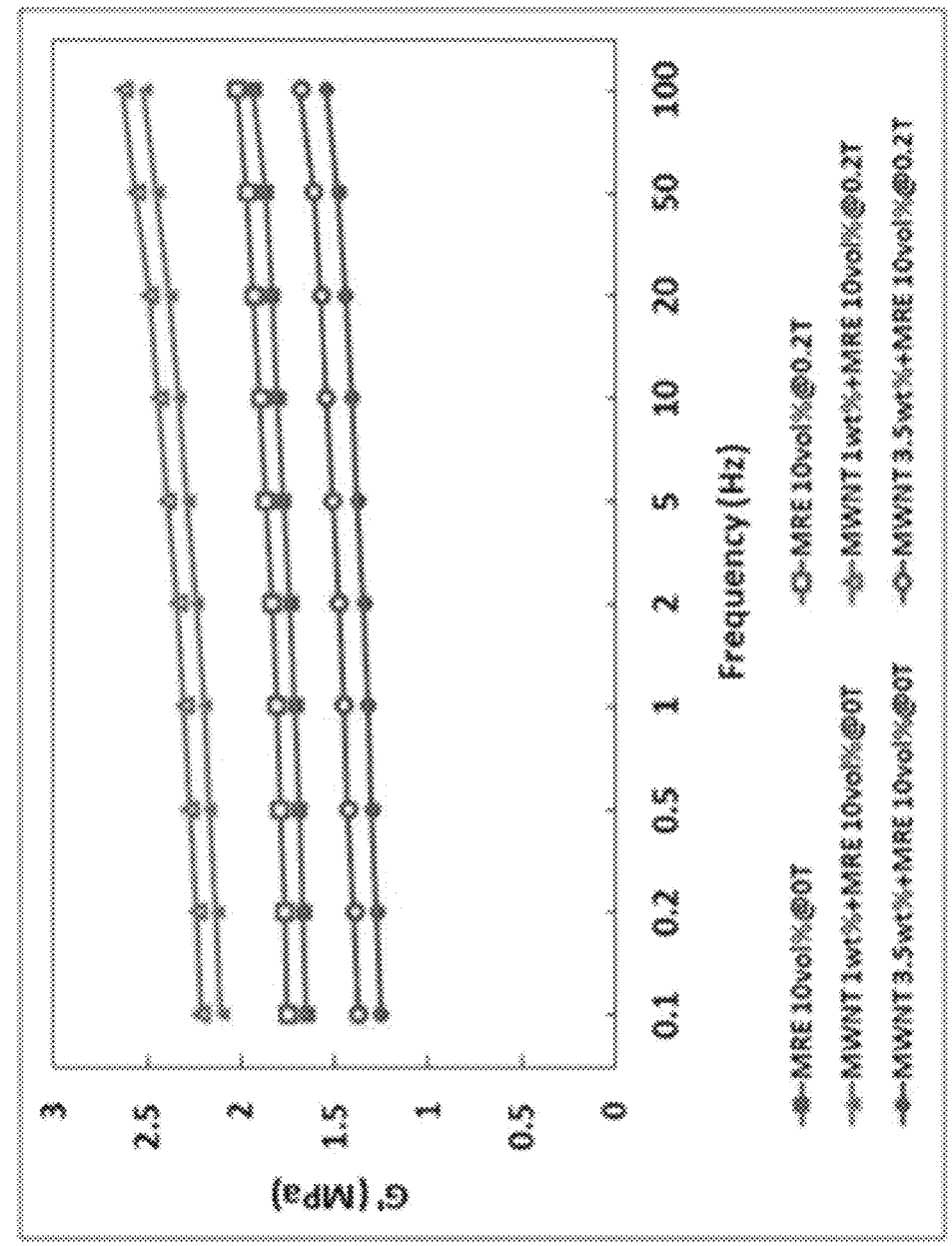
FIG. 4a shows frequency scans of the storage shear modulus of MR elastomers and MR nanocomposites with 10 vol % iron particles with and without applied magnetic fields. The dynamic strain amplitude is 2%.
Figure 4B:
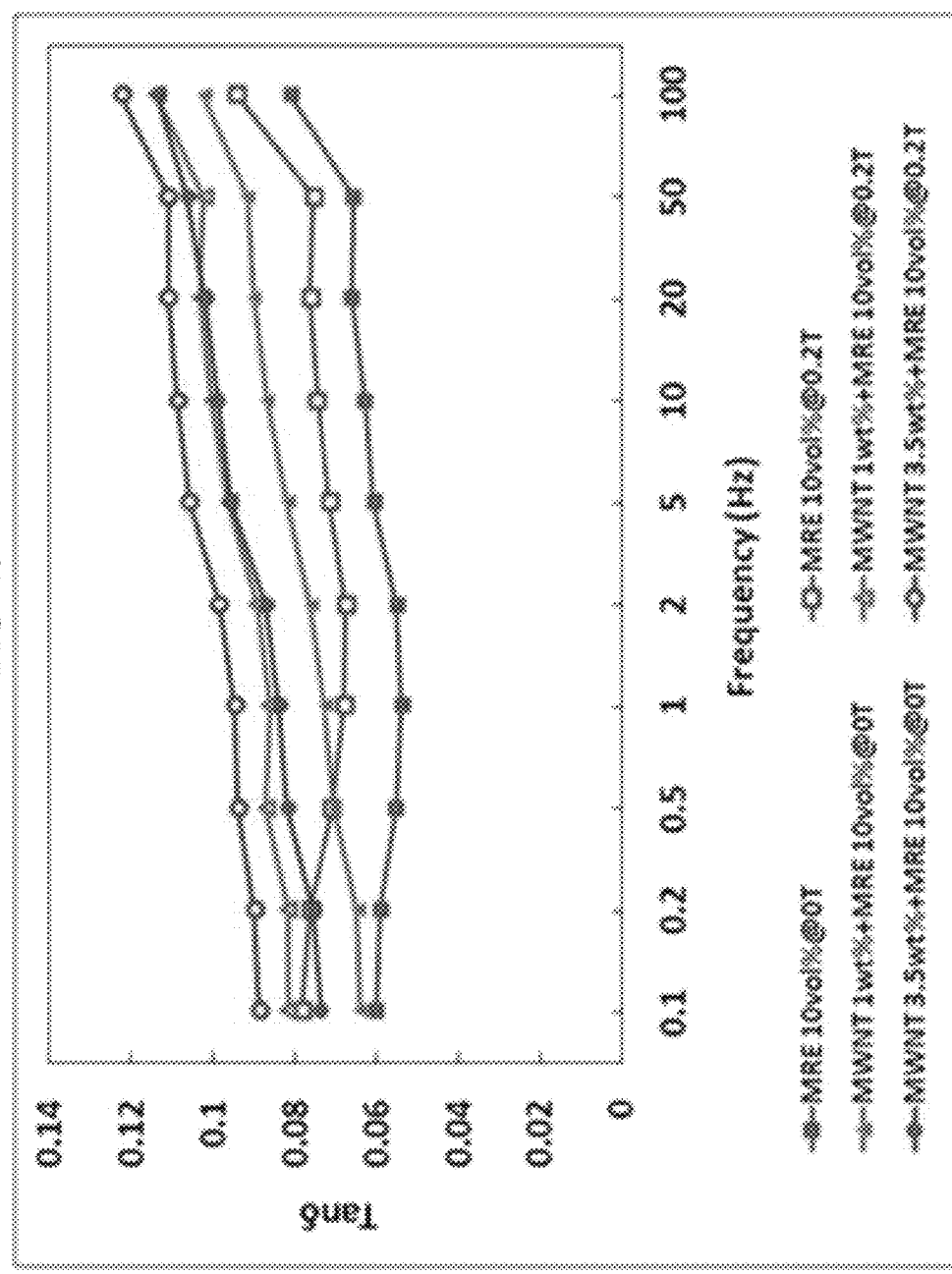
FIG. 4b shows the frequency scans of the loss factor of MR elastomers and MR nanocomposites with 10 vol % iron particles with and without applied magnetic fields. The dynamic strain amplitude is 2%.
Figure 5A:
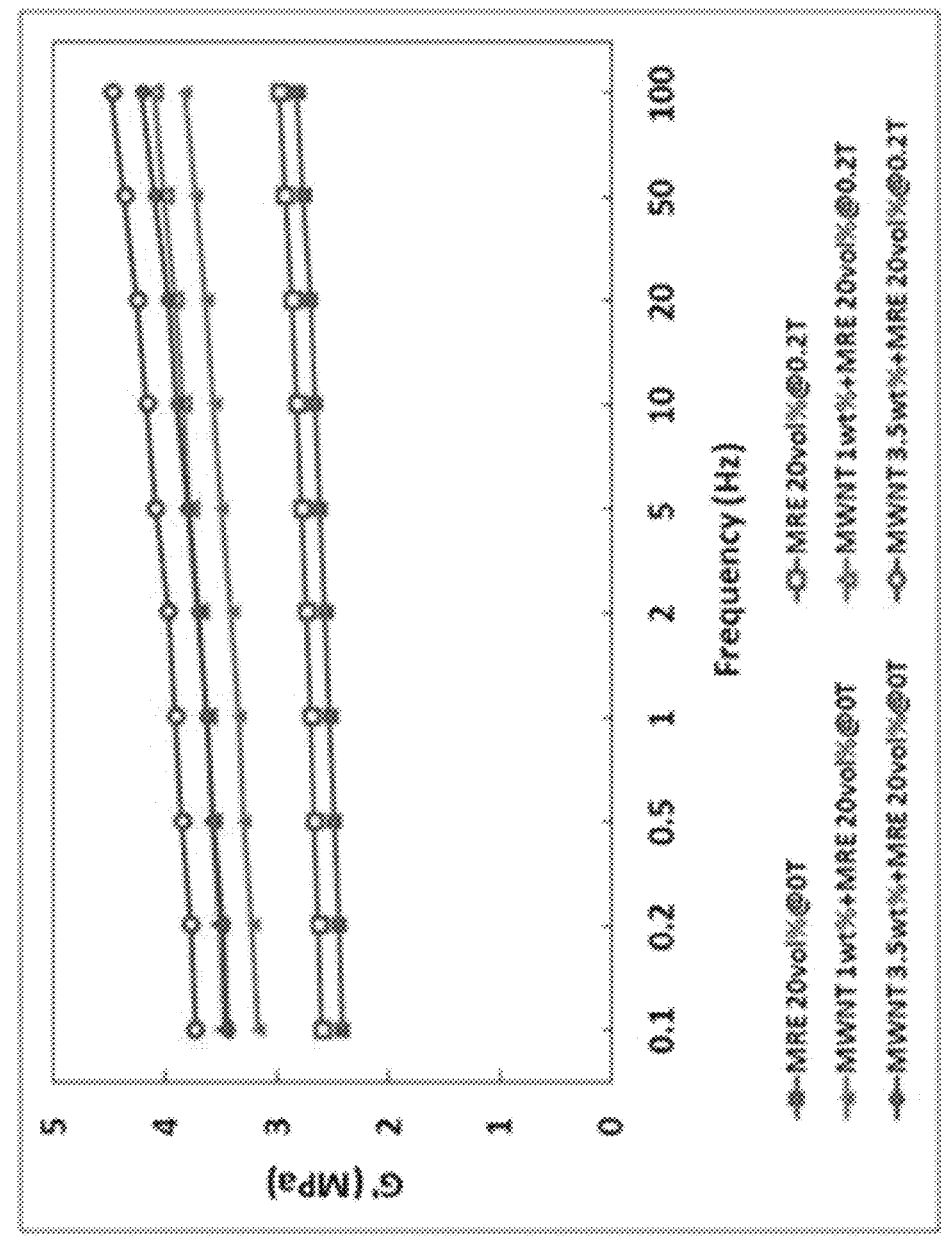
FIG. 5a shows the frequency scans of the storage shear modulus of MR elastomers and MR nanocomposites with 20 vol % iron particles with and without applied magnetic fields. The dynamic strain amplitude is 2%.
Figure 5B:
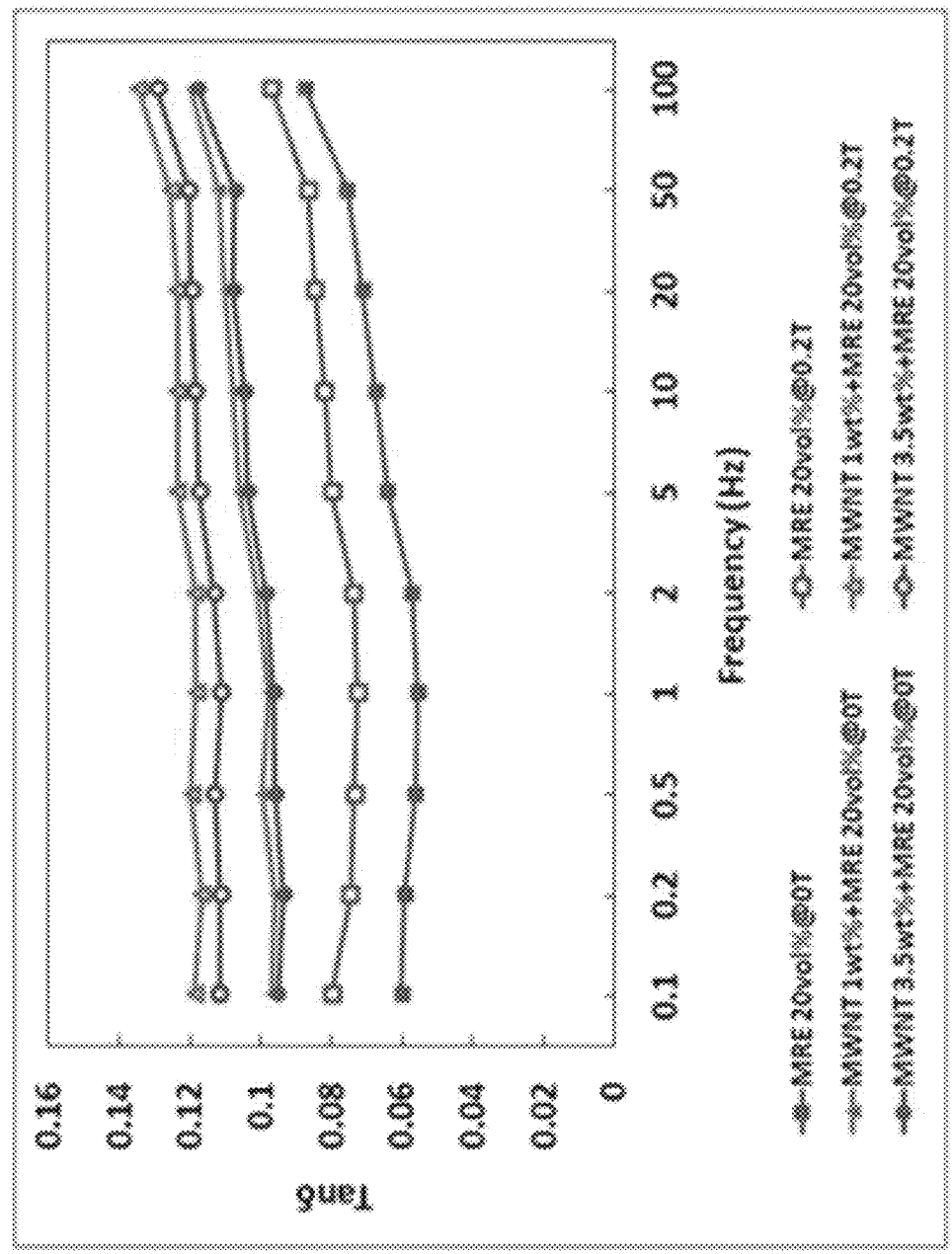
FIG. 5b shows the frequency scans of the loss factor of MR elastomers and MR nanocomposites with 20 vol % iron particles with and without applied magnetic fields. The dynamic strain amplitude is 2%.
Figure 6A:
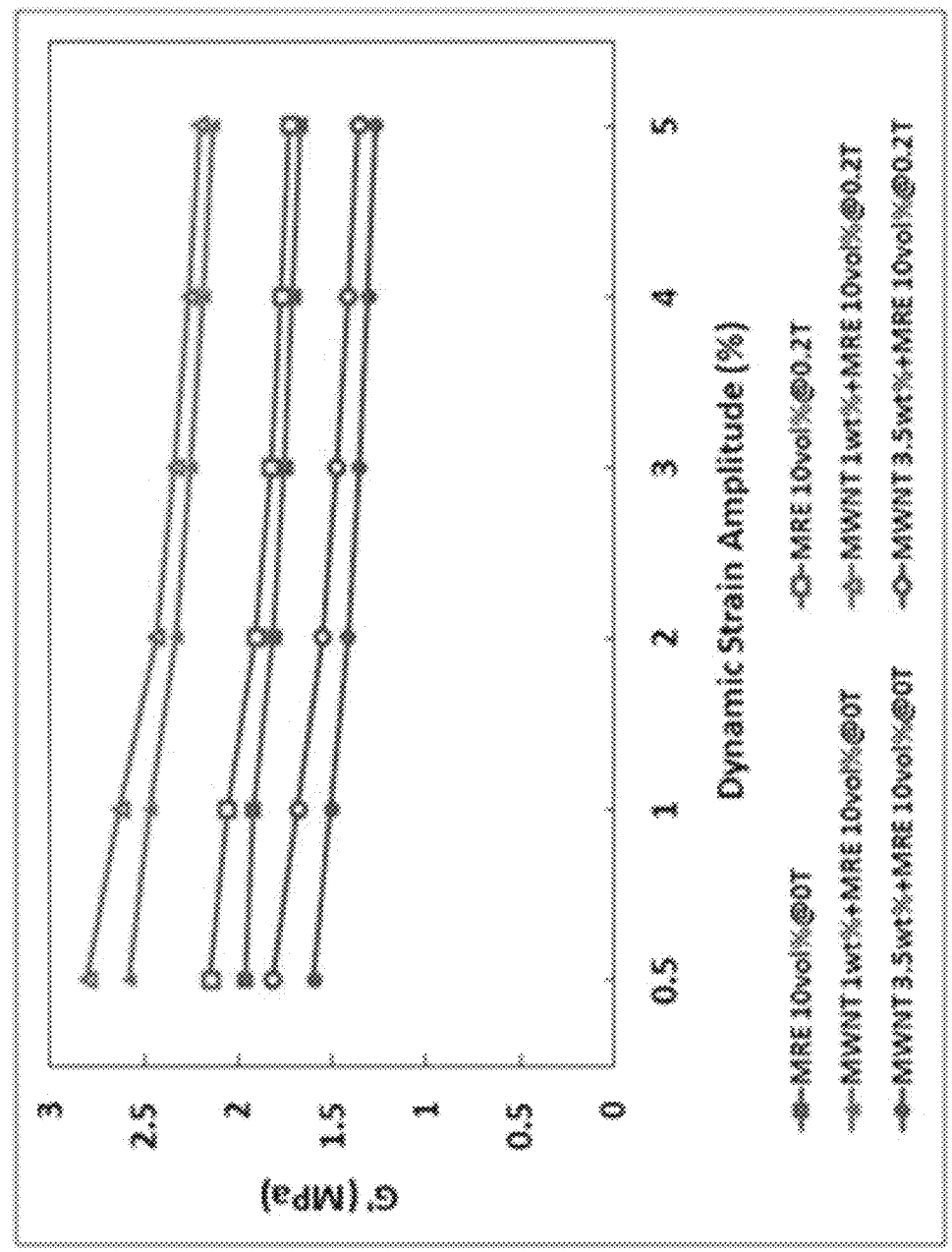
FIG. 6a shows the dynamic strain amplitude 301 scans of the storage shear modulus of MR elastomers and MR nanocomposites with 10 vol % iron particles with and without applied magnetic fields. The testing frequency is 10 Hz.
Figure 6B:
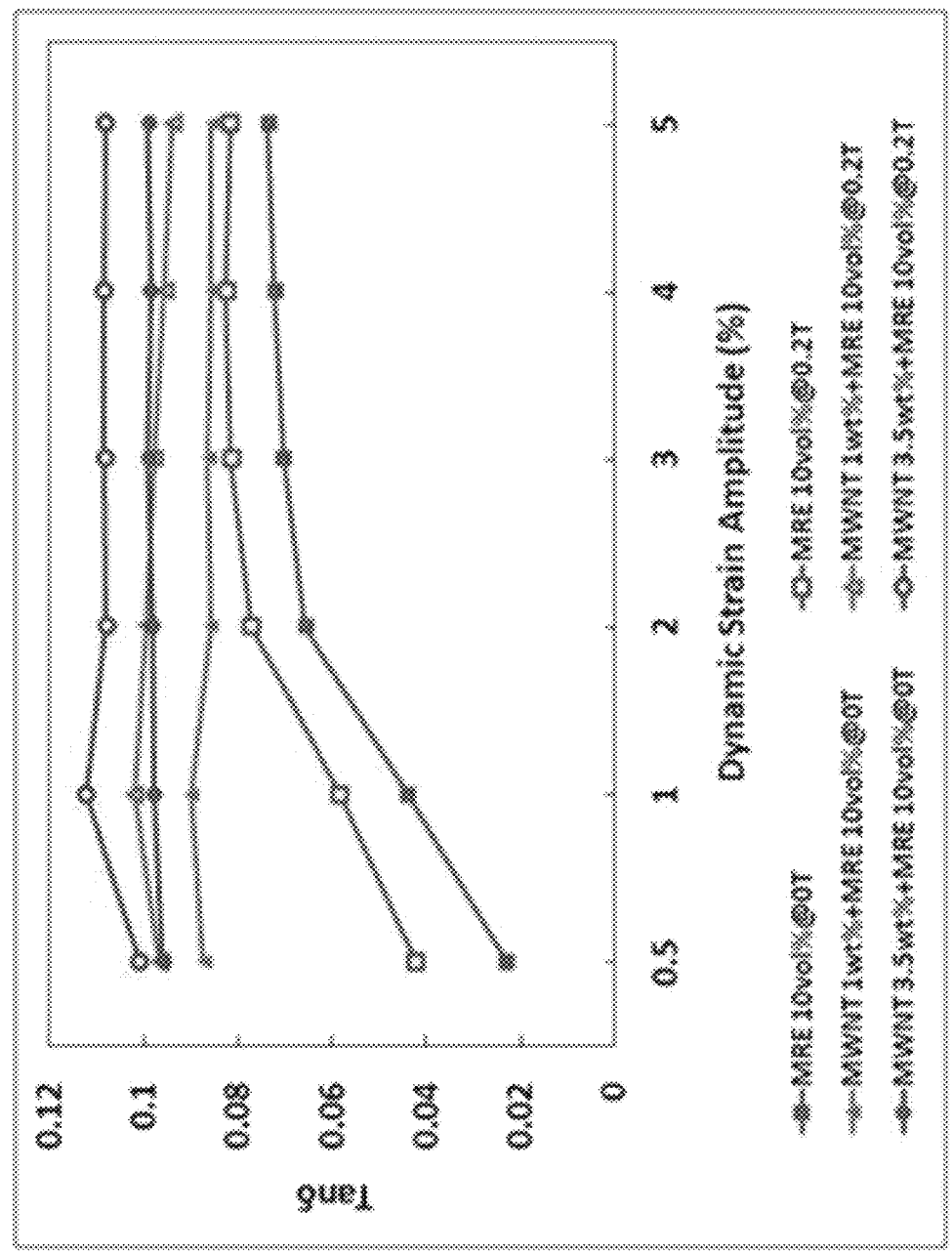
FIG. 6b shows the dynamic strain amplitude scans of the loss factor of MR elastomers and MR nanocomposites with 10 vol % iron particles with and without applied magnetic fields. The testing frequency is 10 Hz.
Figure 7A:
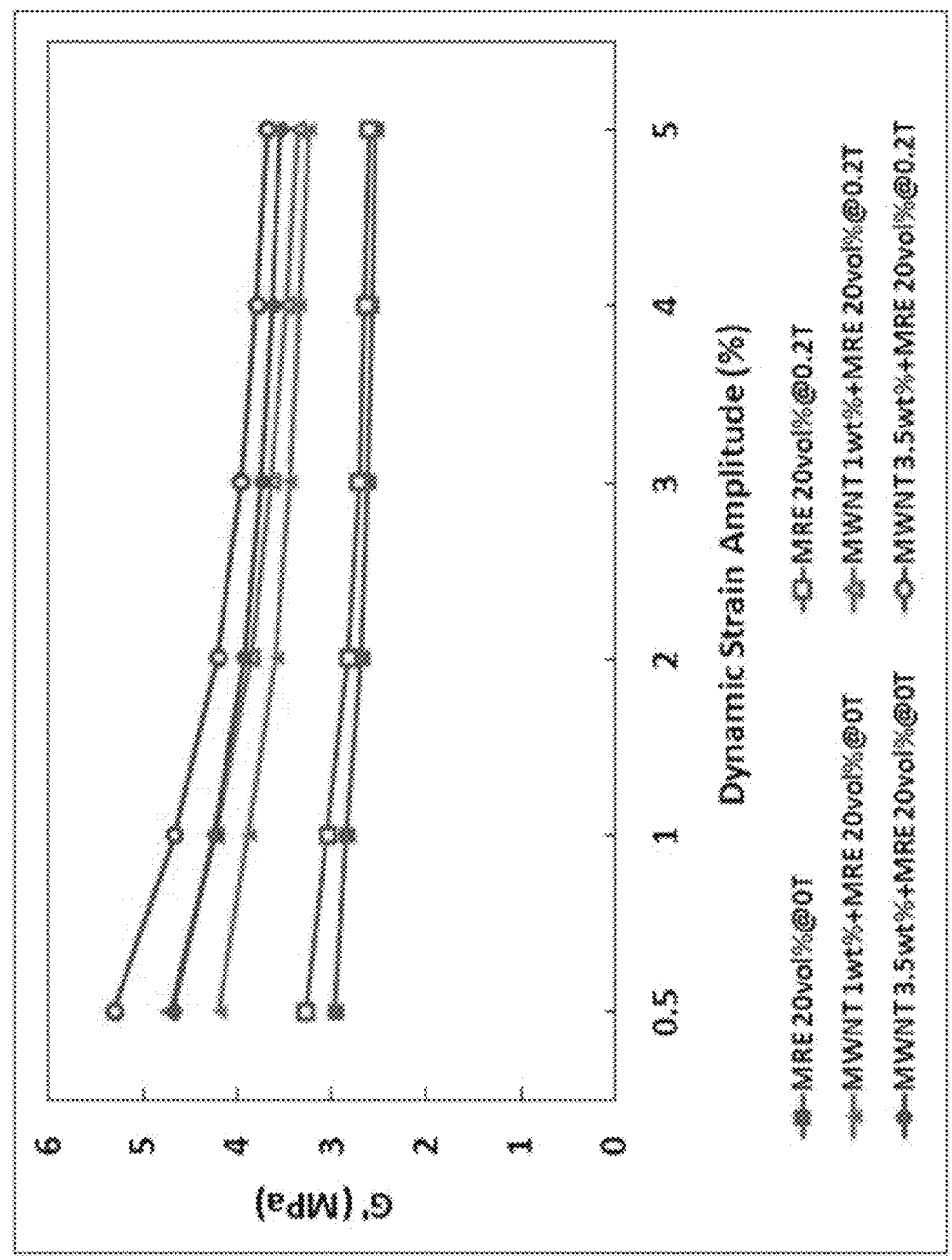
FIG. 7a shows the dynamic strain amplitude scans of the storage shear modulus of MR elastomers and MR nanocomposites with 20 vol % iron particles with and without applied magnetic fields. The testing frequency is 10 Hz.
Figure 7B:
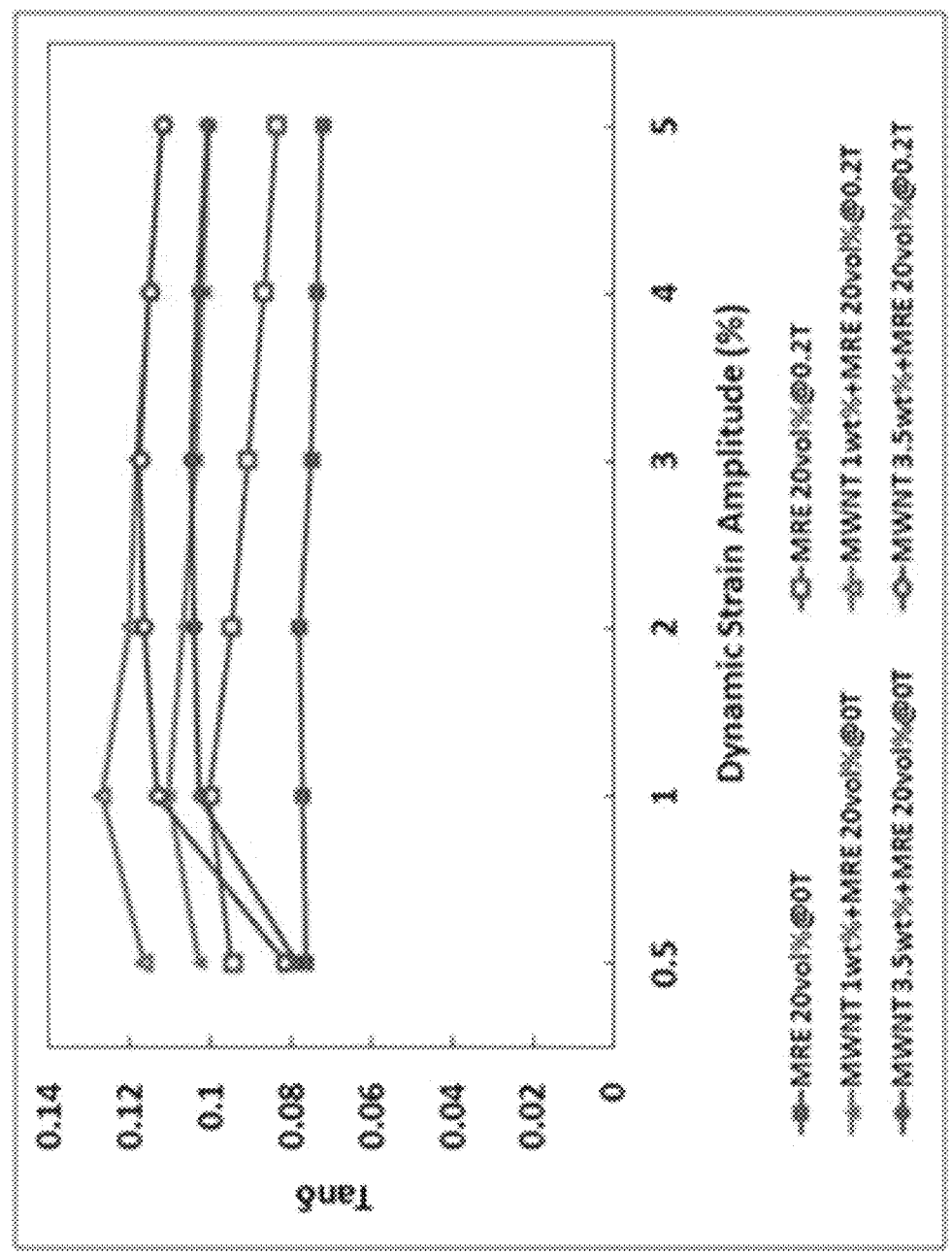
FIG. 7b shows dynamic strain amplitude scans of the loss factor of MR elastomers and MR nanocomposites with 20 vol % iron particles with and without applied magnetic fields. The testing frequency is 10 Hz.
Figure 8A:
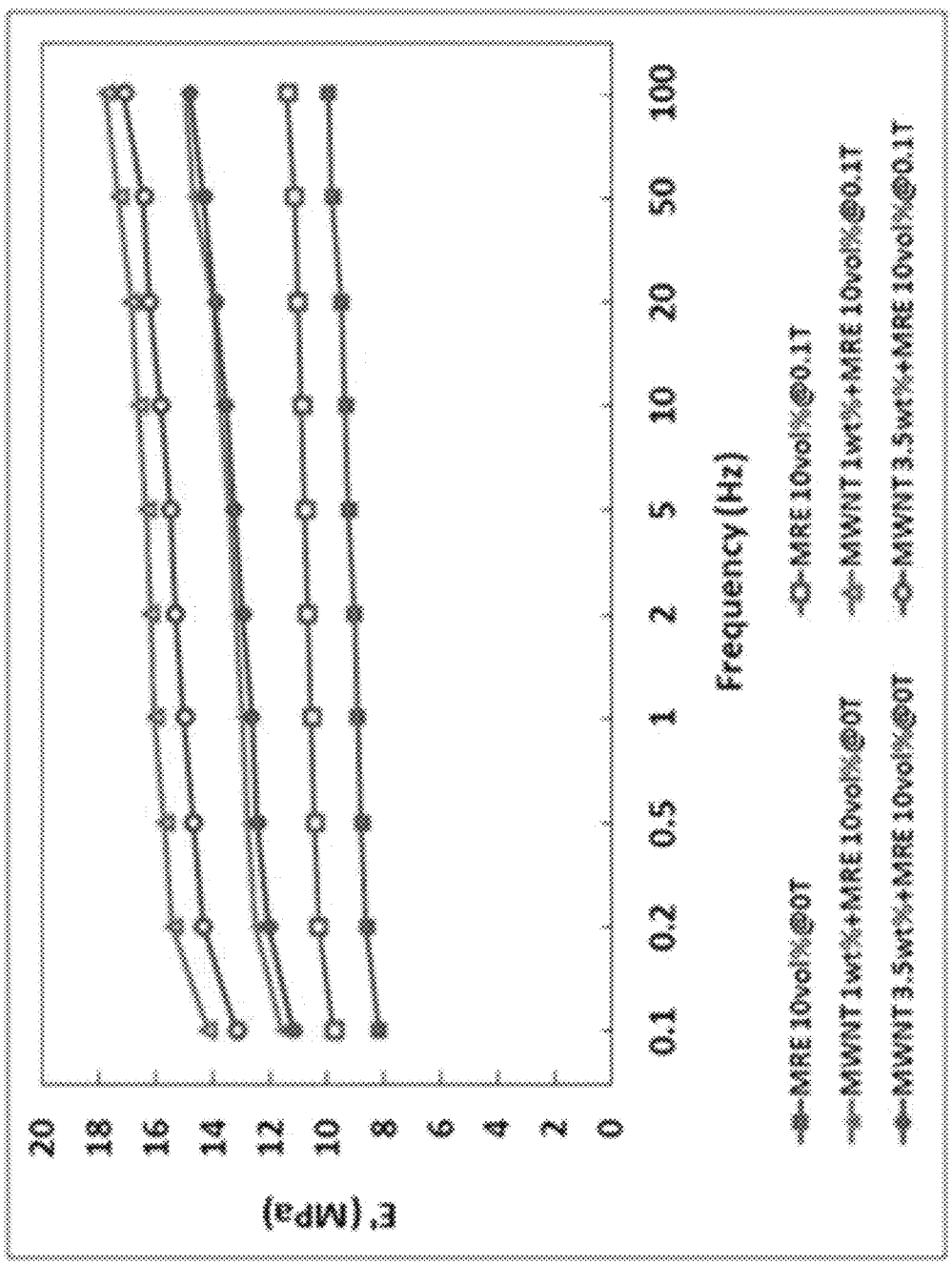
FIG. 8a shows the frequency scans of the storage Young's modulus of MR elastomers and MR nanocomposites with 10 vol % iron particles with and without applied magnetic fields. The dynamic strain amplitude is 2%.
Figure 8B:
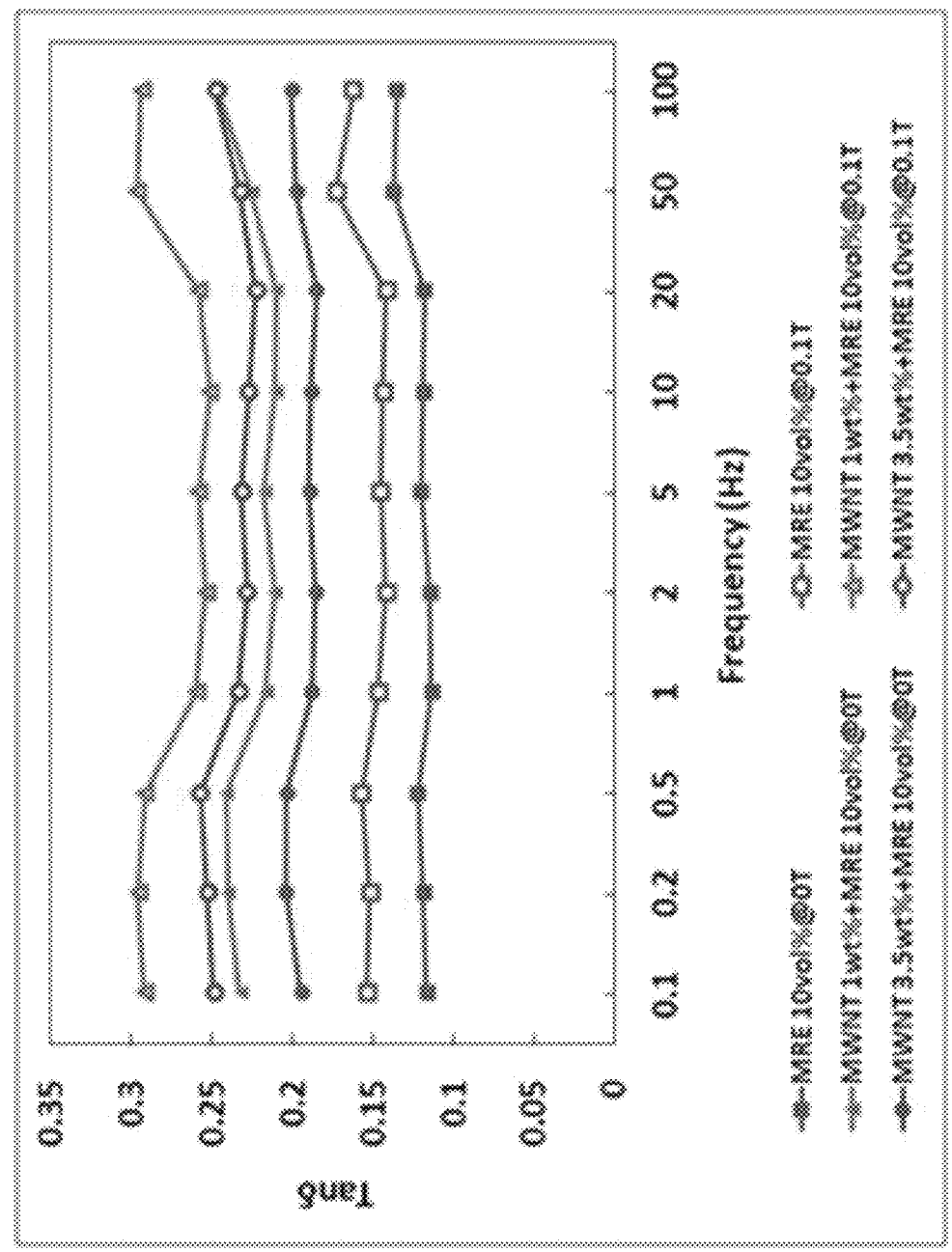
FIG. 8b shows frequency scans of the loss factor of MR elastomers and MR nanocomposites with 10 vol % iron particles with and without applied magnetic fields. The dynamic strain amplitude is 2%.
Figure 9A:
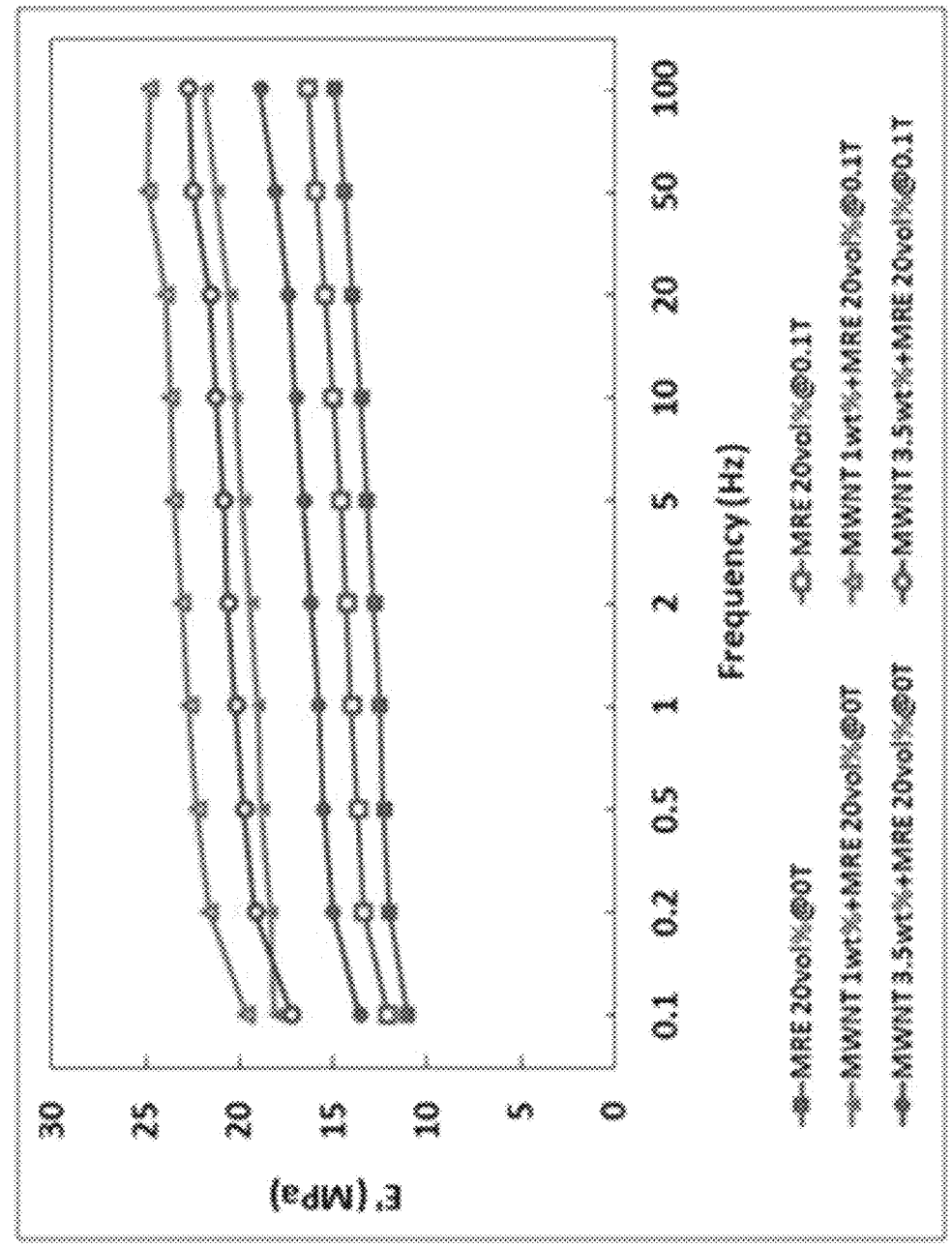
FIG. 9a shows frequency scans of the storage Young's modulus of MR elastomers and MR nanocomposites with 20 vol % iron particles with and without applied magnetic fields. The dynamic strain amplitude is 2%.
Figure 9B:
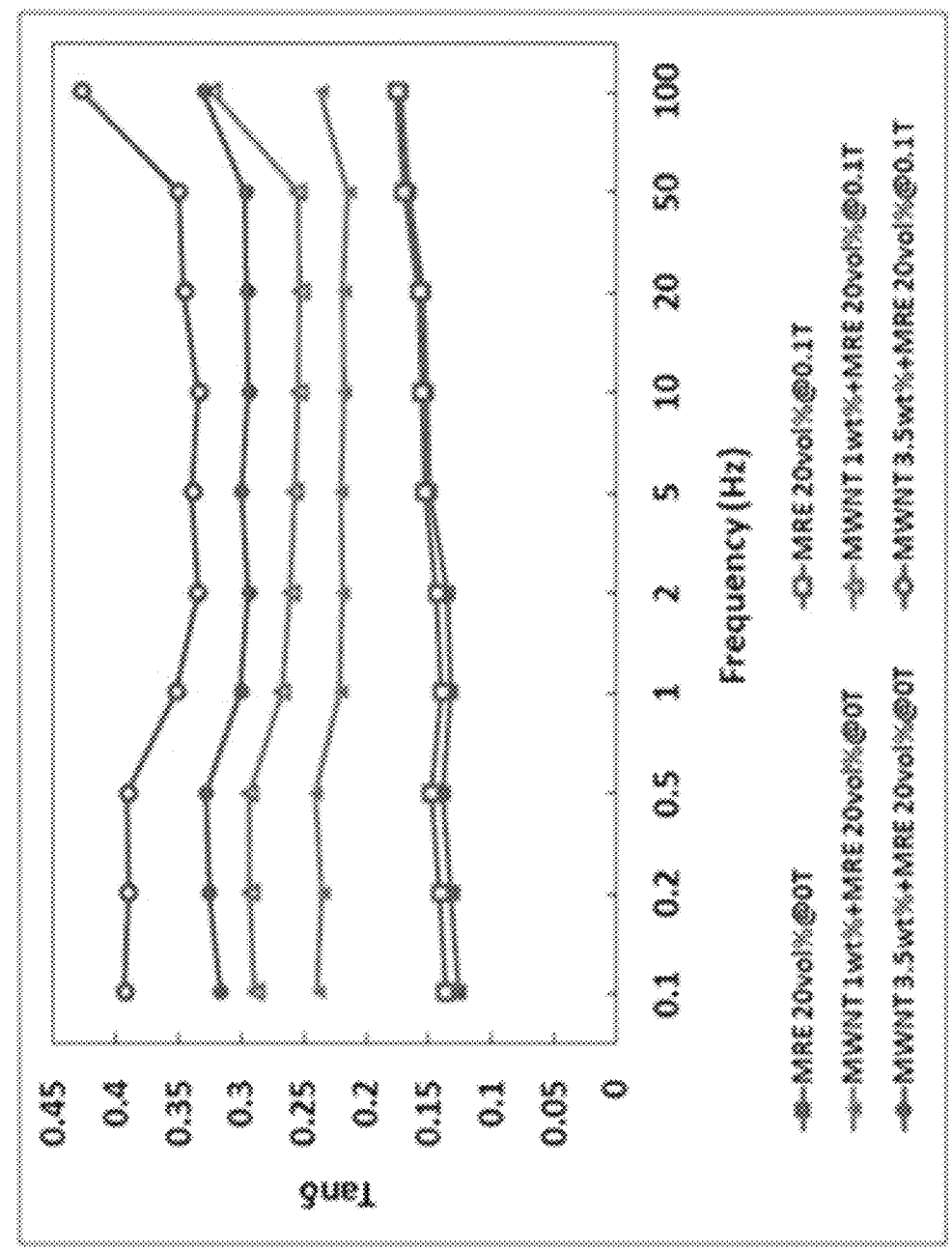
FIG. 9b shows frequency scans of the loss factor of MR elastomers and MR nanocomposites with 20 vol % iron particles with and without applied magnetic fields. The dynamic strain amplitude is 2%.
Figure 10A:
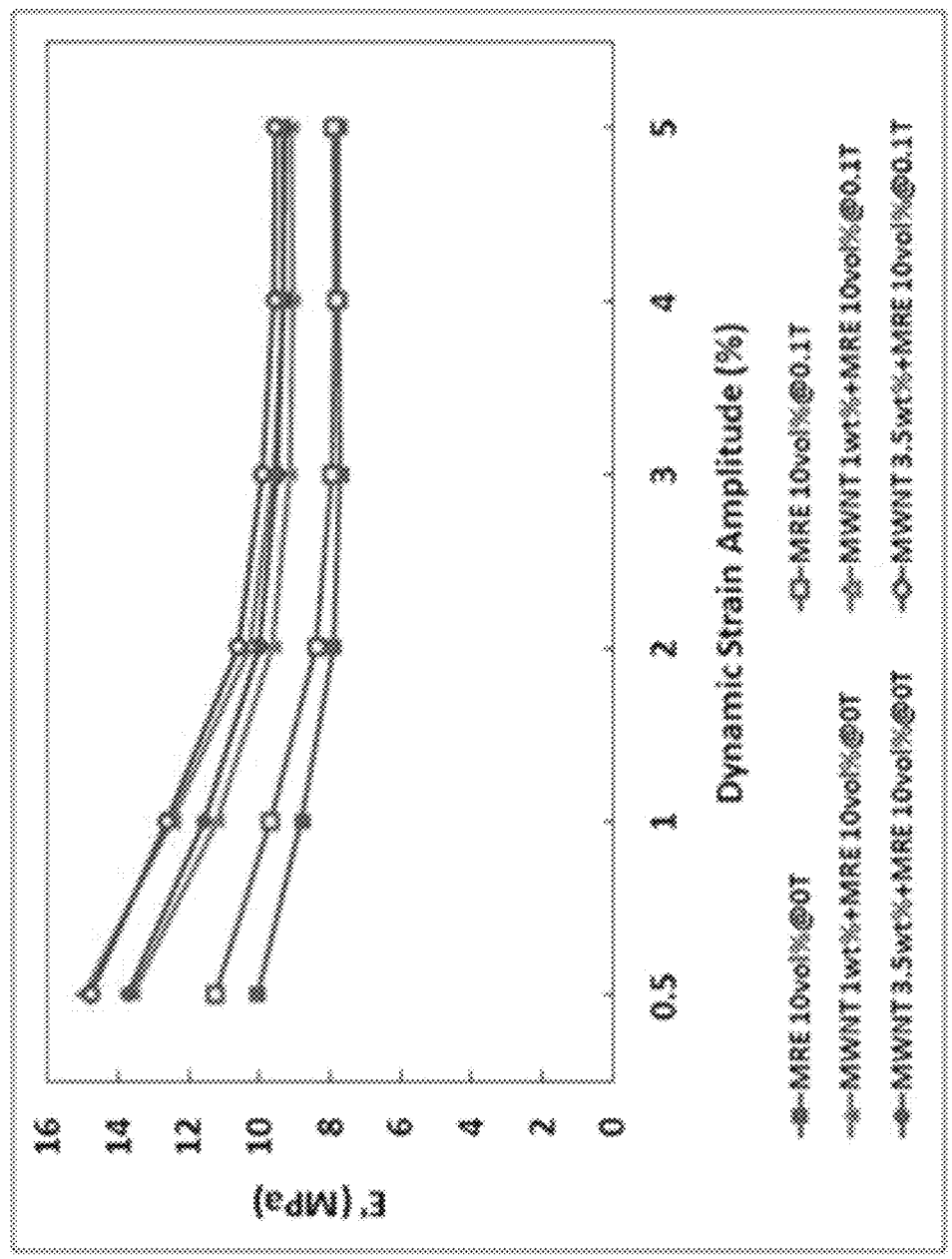
FIG. 10a shows dynamic strain amplitude scans of the storage Young's modulus of MR elastomers and MR nanocomposites with 10 vol % iron particles with and without applied magnetic fields. The testing frequency is 10 Hz.
Figure 10B:
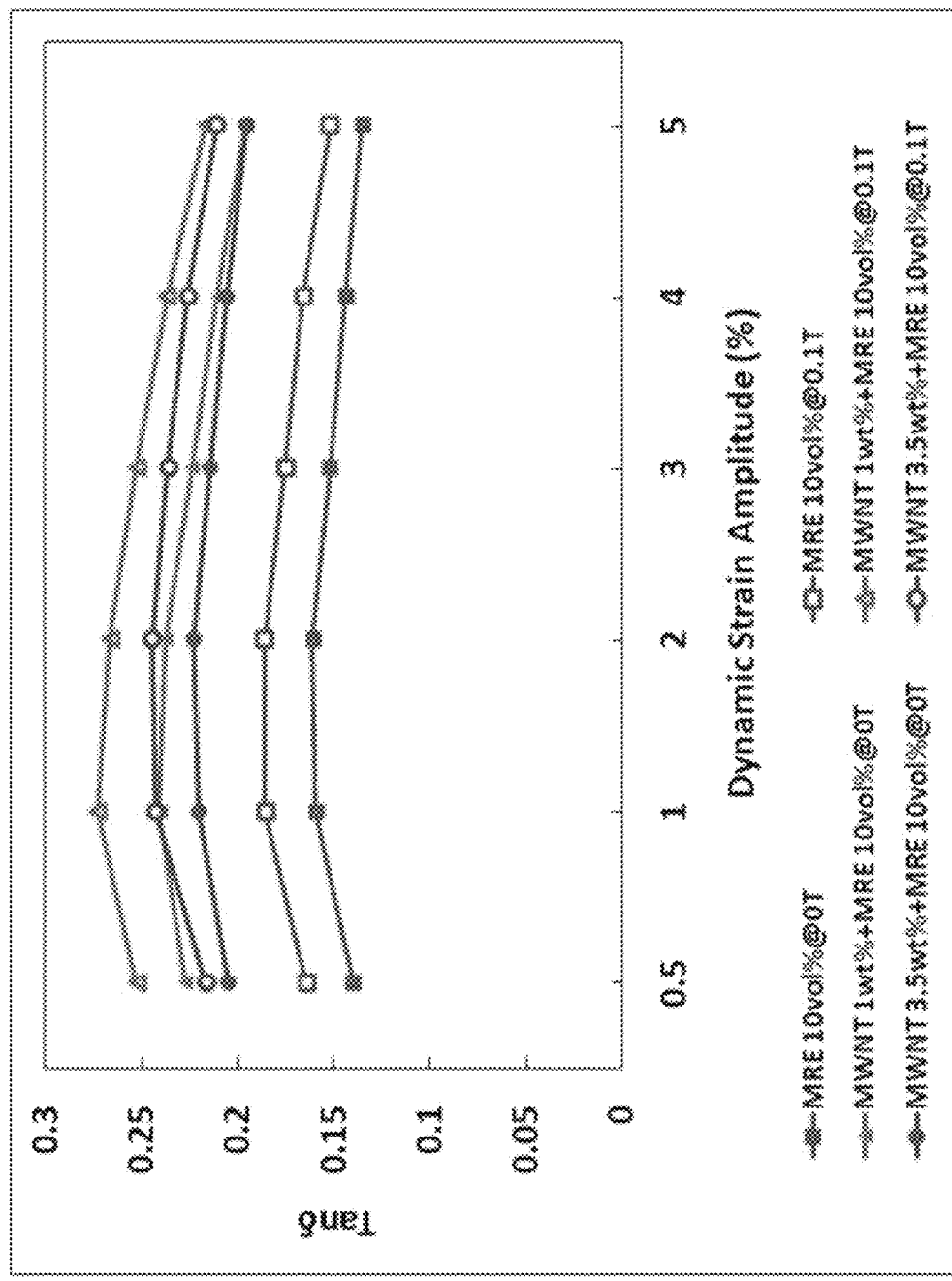
FIG. 10b shows dynamic strain amplitude scans of the loss factor of MR elastomers and MR nanocomposites with 10 vol % iron particles with and without applied magnetic fields. The testing frequency is 10 Hz.
Figure 11A:
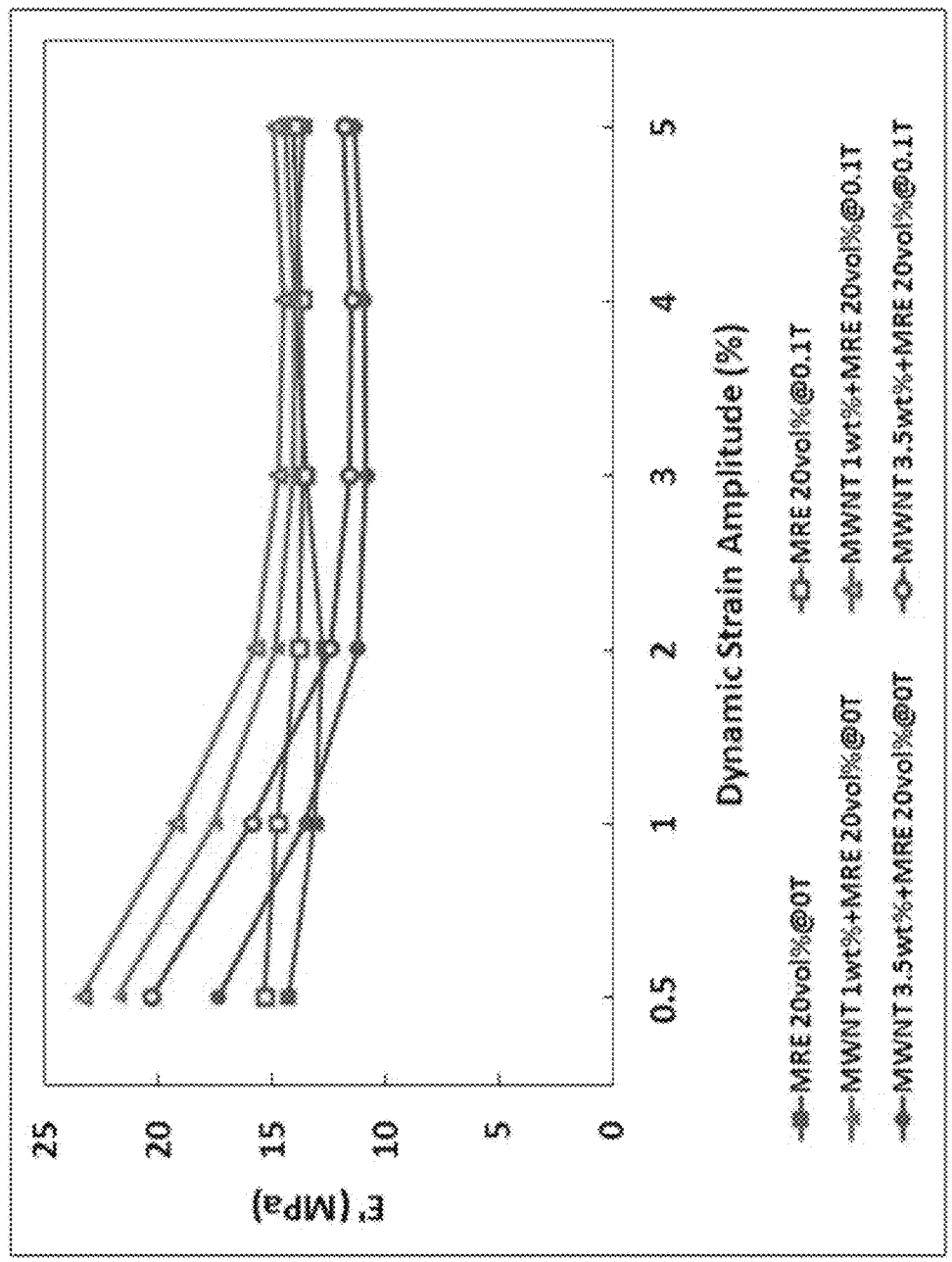
FIG. 11a shows dynamic strain amplitude scans of the storage Young's modulus of MR elastomers and MR nanocomposites with 20 vol % iron particles with and without applied magnetic fields. The testing frequency is 10 Hz.
Figure 11B:
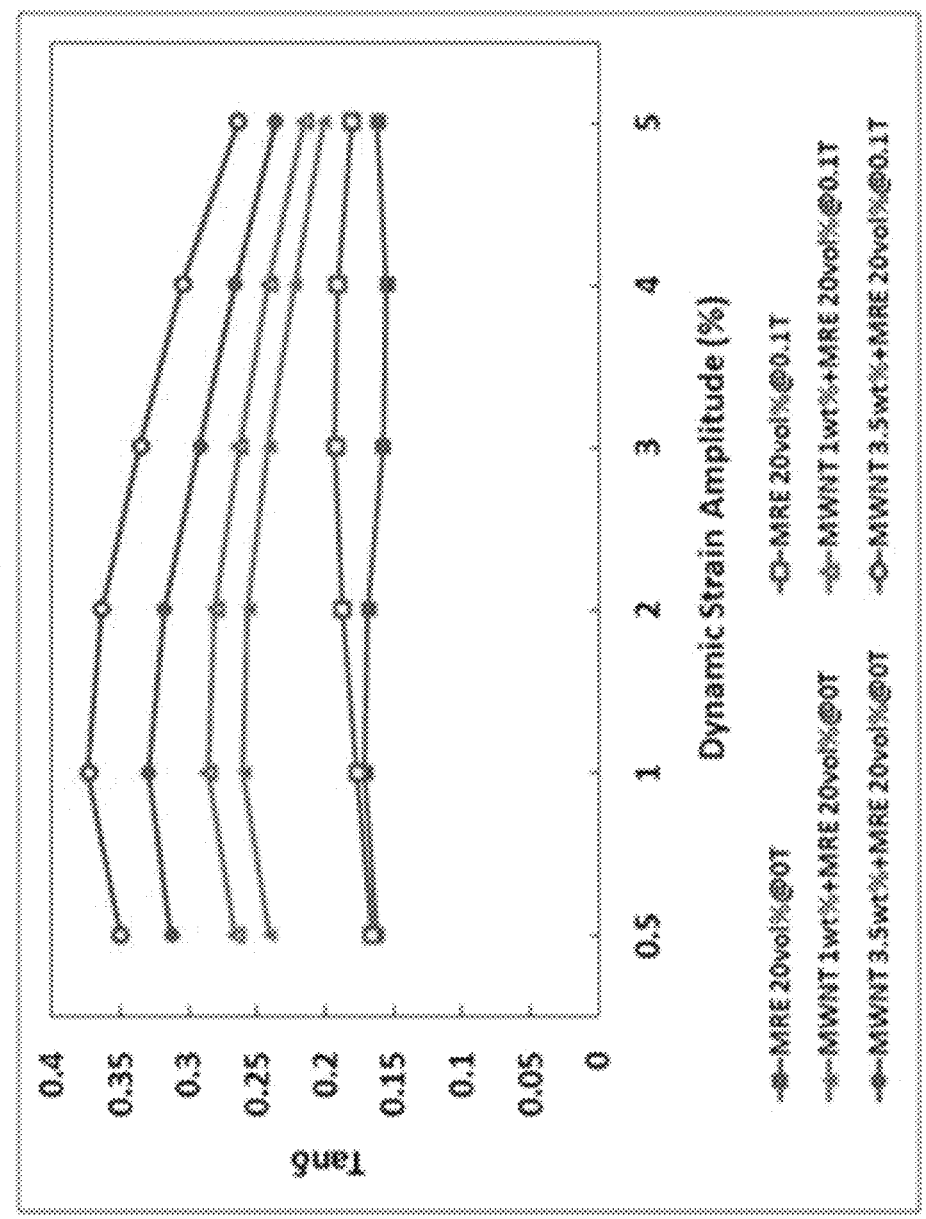
FIG. 11b shows dynamic strain amplitude scans of the loss factor of MR elastomers and MR nanocomposites with 20 vol % iron particles with and without applied magnetic fields. The testing frequency is 10 Hz.

The dynamic viscoelastic behavior of the MR nanocomposites and MR elastomers under applied magnetic fields was characterized at room temperature with a Bose ElectroForce® 3200 dynamic mechanical analyzer. External magnetic fields were applied parallel to the direction of particle chains in the samples to evaluate the MR effect. For compression testing, a customized magnetic coil driven by a DC power supply was used, and at the maximum current output the flux density was 0.1 Tesla at the center of the air core, measured with a gaussmeter (model 421 by Lake Shore Cryotronics Inc.). As for the single-lap shear test, a permanent magnet with rectangular pole areas and adjustable pole spacing was used. The flux density was 0.2 Tesla on the center of the gap at a gap distance of 28 mm. Stronger magnetic fields were achievable, however, at the cost of excessive lateral magnetic forces on the samples which impairs testing stability. Given the small sample sizes, the magnetic fields were almost uniform across the samples. To guarantee the precision of testing, a safe distance is always kept between the applied magnetic field and the driving motor and load cell of the testing machine. In addition, titanium DMA grips and platens were used as well. The testing configurations are shown in FIGS. 3a and b. Oscillatory strain is applied to the samples during the tests, at a set of dynamic strain amplitudes (peak-to-peak) and exciting frequencies. The storage moduli (E', G') and loss factors (tan δ in compression and shear modes) are calculated from the recorded amplitudes and phases of the input strain and output stress, based on the Fast Fourier transform (FFT).

Results

The testing results from shear tests are presented in FIGS. 4 to 7, and the results from compression tests are presented in FIGS. 8 to 11. The results from both frequency scans and dynamic strain amplitude scans are shown for each testing mode.

FIGS. 4, 5, 8 and 9 show the frequency scans of storage shear modulus G', storage Young's modulus E', and loss factor tan δ of MR elastomers and MR nanocomposites in both shear and compression modes. The overall upward trend of all these properties as frequency increases reflects the viscoelastic nature of elastomer composites. Accordingly, the addition of MWNTs to MR elastomers improved the zero-magnetic-field dynamic stiffness and damping performance in both shear and compression deformations. However, MR nanocomposites with 3.5 wt % of MWNTs in the matrix did not constantly exhibit higher dynamic stiffness and damping than those with 1 wt % of MWNTs in the matrix, and might have resulted from defects within the specimens due to fabrication issues. For G', E', and the associated tan δ, the absolute MR effect is not very sensitive to frequency changes, which results in gradually decreased relative MR effect as the frequency goes up. Without wishing to be bound by theory, this phenomenon might be related to the magnetic interaction forces between particles responding to the applied magnetic field at a very fast speed with hardly any time lag.

In shear tests, MR nanocomposites showed notably increased absolute MR effect on G' however almost unchanged absolute MR effect on tan δ. In compression tests, MR nanocomposites exhibit significantly enhanced absolute MR effect on both E' and tan δ. Generally, the MR effect results from the magnetic interaction between iron particles; therefore it is thought that the added MWNTs influenced the MR effect in an indirect way. Without wishing to be bound by theory, one possible mechanism is that when MWNTs are added, both the properties of the matrix and the interfaces between iron particles and matrix are altered. In addition, it is generally observed that different levels of particle clustering exist in the MR elastomers as a result of non-perfect dispersion of particles, and the way in which iron particles are clustered may be changed to some extent due to the modified matrix properties during the fabrication process. The distinct interfacial condition and microstructure of the particle clusters together may contribute to the change in the MR effect.

The comparison between MR elastomer with 20 vol % of iron particles and MR nanocomposite with 20 vol % of iron particles and 1 wt % of MWNTs in the matrix in shear mode is discussed as follows. The zero-field G' and tan δ of MR nanocomposite are at least 30% and 40% higher than those of conventional MR elastomers, respectively, which shows the effective mechanical reinforcement by only 1 wt % of MWNTs in the silicone rubber matrix. The absolute MR effect on G' of MR nanocomposite can reach up to 0.3 MPa, which is almost 70% higher than that of conventional MR elastomers, while the relative MR effect on G' is only around 25% higher since the zero-field G' is also increased. In case of tan δ, the absolute MR effect remains almost unchanged change while the relative MR effect decreases.

In some cases, while the relative MR effect can frequently be related to the tunability of the smart composite, low initial properties of the MR effect parameters are frequently related to high relative MR effect values. Further, in some applications, such as where high initial modulus and damping are desirable, the addition of MWNTs successfully brings higher absolute MR effect at a fixed volume fraction of iron particles.

FIGS. 6, 7, 10 and 11 show the dynamic strain amplitude sweeps of storage shear modulus G', storage Young's modulus E', and loss factor tan δ of MR elastomers and MR nanocomposites in both shear and compression modes. The graphs show an overall trend of as strain amplitude increases, G' and E' drop gradually and tan δ first rises a bit and then drops slightly. This phenomenon is referred to as Payne effect. Without wishing to be bound by theory, it is believed that the main reason for the Payne effect is that as dynamic strain increases, the breakdown of filler networks tends to release more formerly entrapped elastomer, resulting in decreased dynamic stiffness. The absolute and relative MR effect on both G' and E' of all composites tested decreased simultaneously when strain amplitudes increases. Without wishing to be bound by theory, this is believed to be due to the rapid attenuation of magnetic interaction as inter-particle distance increases. At all tested strain amplitude levels, MR nanocomposites tested showed higher absolute MR effect than MR elastomers do, however, this difference went smaller at higher strain levels.

Regarding tan δ, the absolute MR effect of all composites tested decreased only slightly as strain amplitude increased, while the relative MR effect increased slightly, showing good control stability of damping when strain level varies at below 5%. At all tested strain levels, the MR nanocomposites showed an absolute MR effect close to that of MR elastomers. In addition, the samples demonstrated good agreement with the model for linear non-viscously damped systems proposed by Adhikari and Wagner (2004) and Wagner (2005) and this and similar models can be used for modeling of the complicated damping behavior of the MR nanocomposites.

In addition, at small deformations, the MR nanocomposites tested exhibited not only higher zero-field stiffness and damping than conventional MR elastomers, but also higher magnetic-field-induced increase, or absolute MR effect, in dynamic stiffness for both testing modes, and in damping under compressive loads. In addition, the dynamic strain amplitude also notably affects both the zero-field dynamic behavior of MR nanocomposites and the corresponding MR effects.

Example 2

Fabrication of a Semi-Active Isolator (Prophetic Example)

Figure 12:
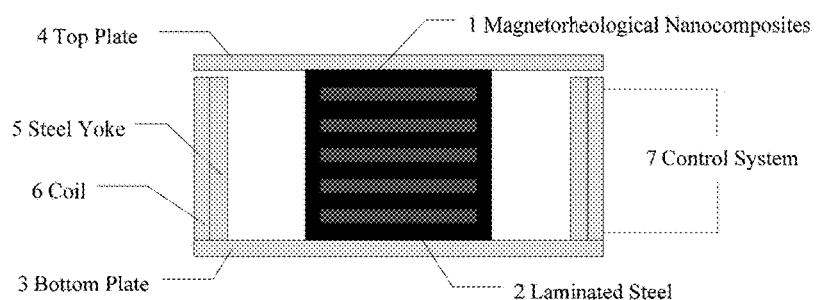
FIG. 12 shows a schematic of a semi-active isolator based on magnetorheological nanocomposites.

A semi-active isolator as shown in FIG. 12 can comprise six parts: a top steel plate 4, a bottom steel plate 3, laminated magnetorheological nanocomposites 1, a steel yoke 5, a coil 6, laminated steel plates 2, and the control system which is connected with the coil. In some embodiments, a gap can be left between the steel yoke and the top plate to accommodate the relevant shearing displacements. In some embodiments, other methods of allowing lateral displacement between these parts can be utilized, such as low friction surfaces or bearings, flexible joints, etc.

Figure 13:
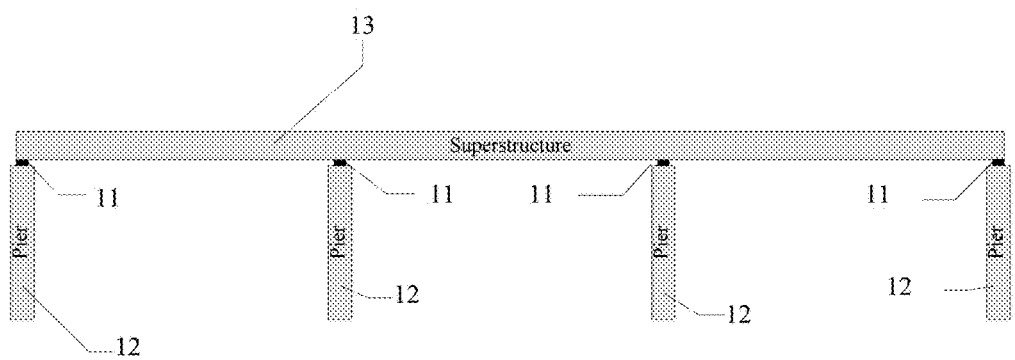
FIG. 13 shows a schematic of isolators based on magnetorheological nanocomposites integrated into a structure.

The isolator of FIG. 12 can be made by the following steps, in an appropriate order:

compress the laminated magnetorheological nanocomposites 1 and laminated steel plates 2 together; glue both ends of the laminated MR nanocomposites 1 and the laminated steel plates 2 to the bottom plate 3 and the top plate 4; install the bottom steel plate to the substructure (as shown in FIG. 13); install the top steel plate to the superstructure (as shown in FIG. 13); weld the steel yoke 5 to the bottom plate 3; wind the coil 6 around the steel yoke; and connect the coil 6 with the control system (not shown).

In FIG. 12, "1" represents the magnetorheological nanocomposites, which is composed of silicone rubber, carbon nanotubes and magnetic Fe particles, or other appropriate elastomer and magnetic or ferromagnetic particles; "2"

represents the laminated steel plates, which can strengthen the vertical compression stiffness of the isolator; "3" represents the bottom steel plate, which is installed on the substructure of e.g. a bridge or a building; "4" represents the top steel plate, which is installed on the superstructure of e.g. a bridge or a building; "5" represents the steel yoke, which supports the coil; "6" represents the coil which twines round "4" to produce the magnetic field; and "7" represents the control system which can give the signal to the coil to adjust the magnetic field. The control system can include acceleration sensors and a semi-active control system.

Example 3

Semi-Active Isolator Use (Prophetic Example)

The semi-active isolators can be installed between the superstructure and the substructure of, for example, a bridge or a building to control the seismic responses such as the translational displacements of the superstructure and the internal stresses of the substructure. FIG. 13 shows semi-active isolators 11 positioned between the piers 12 and the superstructure 13 of the installation.

Example 4

Smart Bearing with Lock-Up Device (Prophetic Example)

Figure 14:
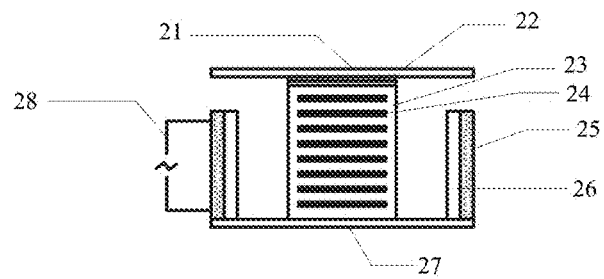
FIG. 14 shows a schematic of a bearing utilizing MREs with carbon nanotubes.

A smart bearing utilizing magnetorheological elastomer with carbon nanotubes can be made as shown in FIG. 14. This design of a smart bearing comprises eight main parts noted in FIG. 14, with a top steel plate 21, a polytetrafluoroethylene plate 22, a layered set of MRE with carbon nanotubes 23, a layered set of steel plates 24, a coil 25, a steel yoke 26, a bottom plate 27 ad a control system 28 (details not shown). In this bearing, the MREs with carbon nanotubes are laminated with steel. This laminated construction also constrains the deformation of the elastomeric portion of the bearing and increase vertical stiffness. The top steel plate can also be designed to be a part of a trigger for initiating the magnetic field. When the trigger or associated systems detect an earthquake, the trigger informs or works with the control system to generate the magnetic field. In addition, the top plate activate a shear key to lock the steel plate 1 to the lower parts so the bearing can act as a unit, but when there is no earthquake, the top plate can slide on the surface of the polytetrafluoroethylene plate. In some embodiments, the shear key can function by magnetizing the layered set of steel plates 24 which then magnetically couples to the top steel plate 21. In applications such as a movable pier, for example where movement between the top steel plate 1 and the polytetrafluoroethylene plate is undesirable, the bearing can be originally connected as a whole with no polytetrafluoroethylene plate and no substantial horizontal sliding movement between the top steel plate 21 and the layered set of MRE with carbon nanotubes 23 or the layered set of steel plates 24.

In some embodiments, the lock-up device can contain a velocity switch to lock the superstructure and the substructure to become a more "fixed" bearing coupling during an earthquake, while at other times the bearing can serve normally as a common bearing without being locked. Advantages of a locked-up form can include changing the structure form of a continuous beam and redistributing the loads between the fixed piers and movable piers to increase the safety margin of the structure in an earthquake.

Example 5

Continuous Beam Application Under Simulated Earthquake Testing (Prophetic Example)

Figure 15:
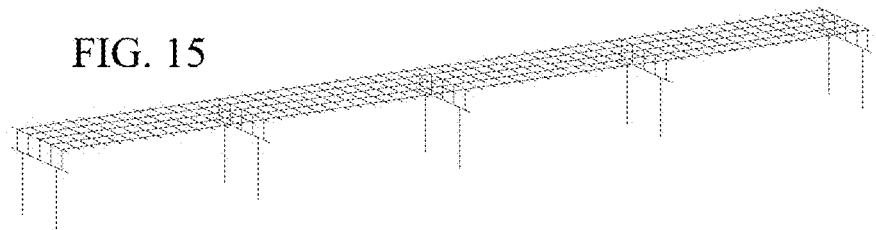
FIG. 15 shows a schematic of the finite element of a continuous beam used for modeling.
Figure 16:
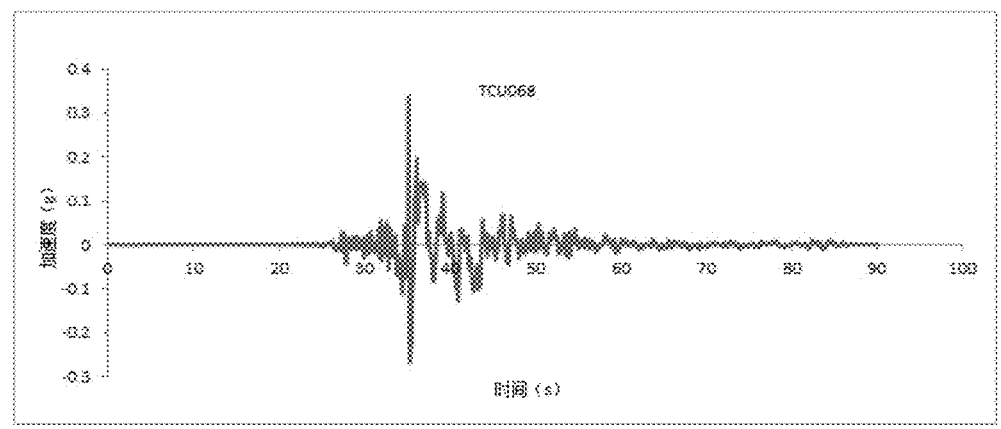
FIG. 16 shows the earthquake wave pattern TCU120 from the Chi-chi earthquake used in modeling.

To evaluate the vibration isolating and reducing effect of isolation bearings utilizing MREs with carbon nanotubes during an earthquake, a 4*40 continuous beam bridge was modeled. The bridge deck width was 12 m, each pier had double columns, column diameter was 1 m, pier height was 15 m, type of bearing was D400, one of the middle piers carried the fixed bearing and others carried movable bearings. The finite element model is shown in FIG. 15. The main beam and pier coping were simulated by beam elements, the bearings were simulated by a Kelvin model. For testing, one of the Chi-chi earthquake records was used as the earthquake input, with the vibration pattern shown in FIG. 16. Two different conditions were analyzed and compared: a common rubber bearing and with MREs with carbon nanotubes intelligent bearings. Table 1 shows three different design conditions used.

TABLE 1 the calculation cases under near-fault excitation

| conditions | Iron particles content % | Carbon nanotubes content % | The shear modulus (MPa) | Loss factor |
|---|---|---|---|---|
| 1 | 0 | 0 | 1.1 | 0.04 |
| 2 | 10 | 1 | 2.0 | 0.1 |
| 3 | 20 | 3.5 | 4.5 | 0.14 |

Note:
Iron particle content measures by volume;
carbon nanotubes content measures by mass;
Magnetic field intensity is 0.2 T.

Figure 17:
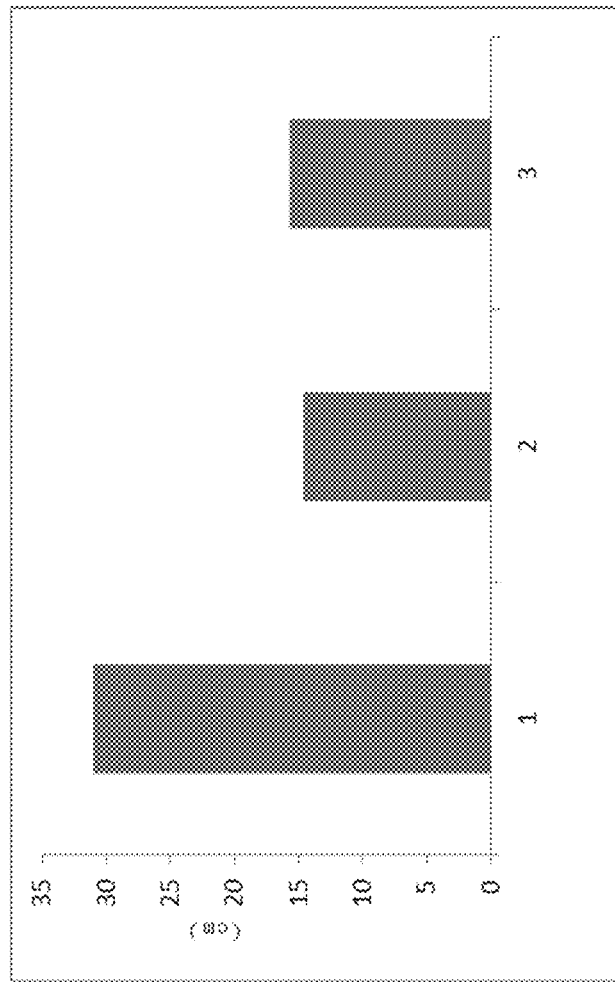
FIG. 17 is a graph of the longitudinal displacements calculated for a beam during modeling.
Figure 18:
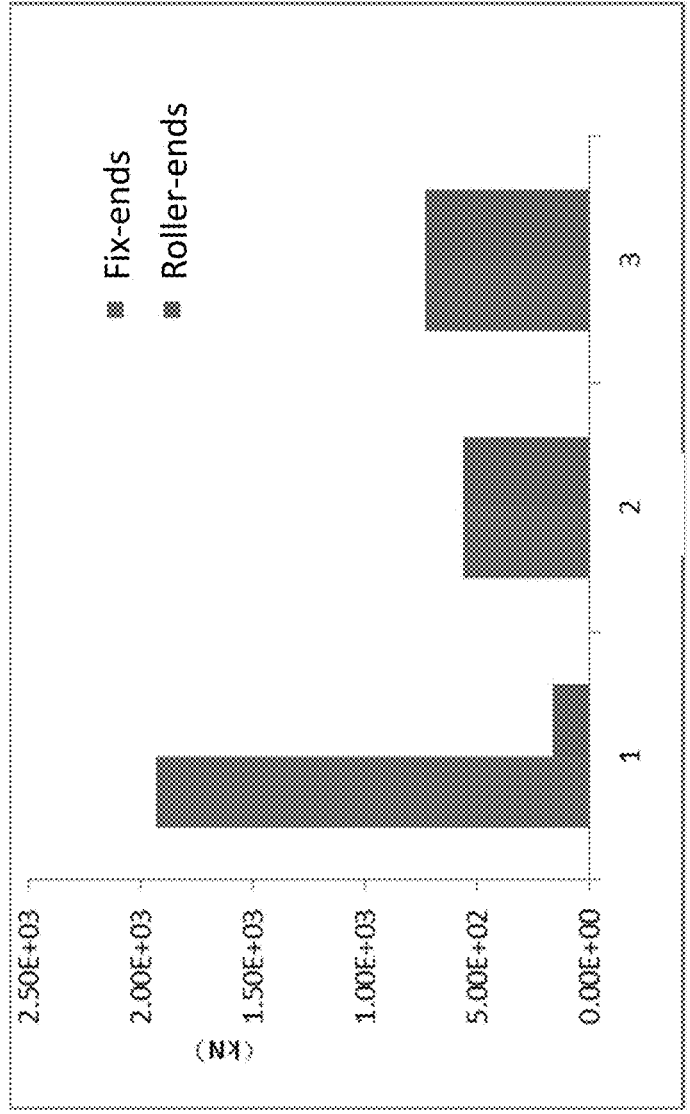
FIG. 18 is a graph of the shear forces of piers calculated during modeling.
Figure 19:
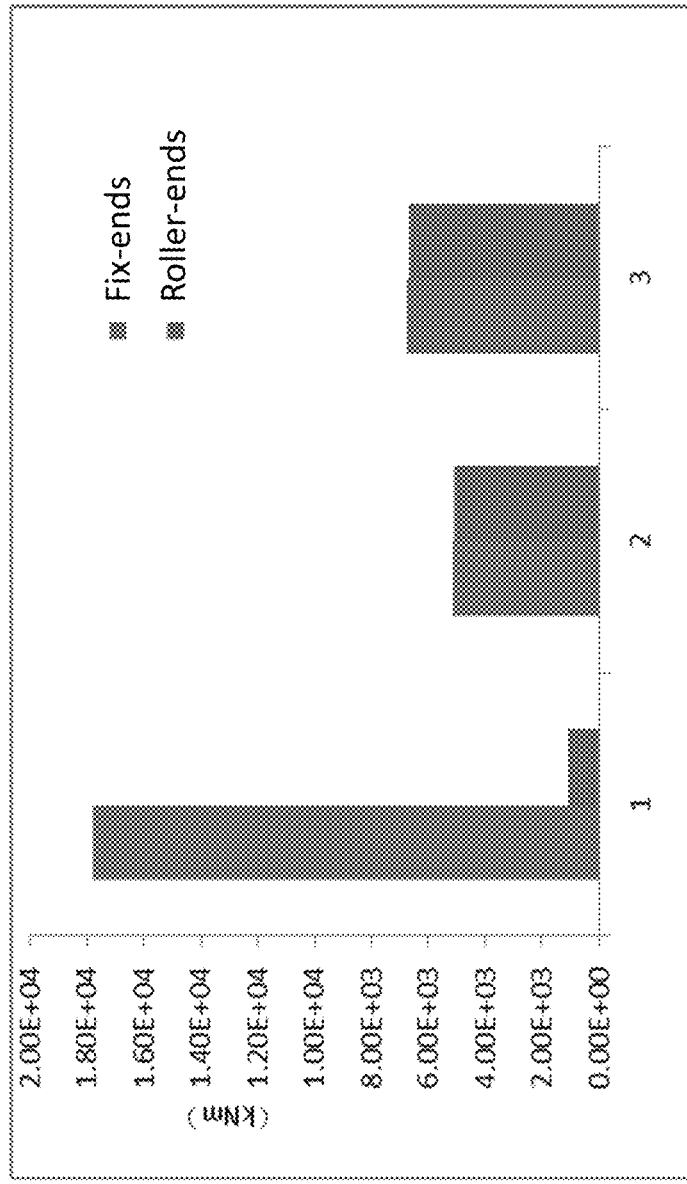
FIG. 19 is a graph of the bending moments of piers calculated during modeling.

The longitudinal displacement, shearing force, and bending moment results of the tests are shown in FIG. 17 to FIG. 19. These results, show that with the same earthquake input, the displacement of the beam decreases by 50%, the fixed pier and movable pier had more similar shear and moment forces for the bearing utilizing MREs with carbon nanotubes as compared to bearings with common rubber bearings. These results demonstrate improved safety factors and improved anti-seismic capacity for bearings utilizing MREs with carbon nanotubes. In addition, similar to a lock-up device, the bearing utilizing MREs with carbon nanotubes when magnetically activated the vibration frequency of the continuous beam still lays in long period segment of the seismic response spectrum but not in the straight line segment of the spectrum.

Having now described the technology in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Concepts as written and equivalents as applicable. Reference to a concept element in the singular is not intended to mean "one and only one" unless explicitly so stated. Moreover, no element, component, nor method or process step in this disclosure is intended to be dedicated to the public regardless of whether the element, component, or step is explicitly recited in the Concepts. No concept element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Concepts

At least the following Concepts are presented herein.

Concept 1. A magnetorheological material (MRM) comprising:
 a polymeric matrix;
 ferromagnetic particles; and
 carbon nanotubes.

Concept 2. The MRM of concept 1, wherein the polymeric matrix is or comprises an elastomer.

Concept 3. The MRM of concept 1, wherein the ferromagnetic particles comprise iron.

Concept 4. The MRM of concept 3, wherein the ferromagnetic particles are iron.

Concept 5. The MRM of concept 1, wherein at least a portion of the ferromagnetic particles are ordered into chains.

Concept 6. The MRM of concept 1, wherein at least a portion of the ferromagnetic particles are associated with at least a portion of the carbon nanotubes.

Concept 7. The MRM of concept 1, wherein at least a portion of the ferromagnetic particles and the carbon nanotubes form a layered arrangement.

Concept 8. The MRM of concept 1, wherein the MRM has a magnetic pole.

Concept 9. The MRM of concept 7, wherein the MRM has a magnetic pole and the pole is substantially parallel to the layers of the layered arrangement.

Concept 10. The MRM of concept 1, wherein the carbon nanotubes are multiwalled nano tubes (MWNT).

Concept 11. The MRM of concept 10, comprising between 1 wt % and 3.5 wt % of MWNT.

Concept 12. The MRM of concept 11, comprising between 10 vol % and 20 vol % of ferromagnetic particles.

Concept 13. The MRM of concept 2, wherein the elastomer is or comprises a silicone material.

Concept 14. A motion damper comprising:
 a base;
 a bearing comprising a magnetorheological material comprising carbon nanotubes, the bearing having a first end attached to said base;
 a coil coupled to the base and capable of controllably submitting the bearing to a magnetic field, wherein the magnetic field changes at least one viscoelastic property of a component of the bearing; and
 an actuator attached to a second end of the bearing.

Concept 15. The motion damper of concept 14, wherein:
 the base comprises a base plate; and
 the actuator comprises an actuation plate.

Concept 16. The motion damper of concept 15, wherein the bearing comprises at least one plate of laminated steel disposed parallel to the base plate; the at least one plate of laminated steel being coated with the magnetorheological material comprising carbon nanotubes.

Concept 17. The motion damper of concept 16, wherein said coil comprises a coil wound around a core attached to the base plate and positioned at a central portion of the bearing.

Concept 18. The motion damper of concept 16, wherein the damper element comprises at least two plates of steel spaced apart from one another and separated by the magnetorheological material comprising carbon nanotubes.

Concept 19. A structure comprising first and second elements and the motion damper of concept 14, wherein:
 the first element of the structure is attached to the base of the electrically controllable motion damper; and
 the second element of the structure is attached to the actuator of the electrically controllable motion damper.

Concept 20. A method of forming a magnetorheological material (MRM) comprising carbon nanotubes, the method comprising:
 mixing the carbon nanotubes in a solvent and stirring the mixture with an ultrasonic processor for a first period of time.

Concept 21. The method of concept 20, further comprising, after said first period of time, adding an elastomer base to the mixture and stirring the mixture with the ultrasonic processor for a second period of time.

Concept 22. The method of concept 21, further comprising adding magnetic particles to the mixture.

Concept 23. The method of concept 22, further comprising, after said second period of time, adding a curing agent and stirring the mixture for a third period of time.

Concept 24. The method of concept 23, comprising using a high speed stirrer to stir the mixture for said third period of time.

Concept 25. The method of concept 23, further comprising, after said third period of time, pouring the mixture in a mold and submitting the mixture in the mold to a magnetic field.

Concept 26. The method of concept 22, comprising evaporating a predetermined portion of the solvent before adding the magnetic particles to the mixture.

Concept 27. A method of making a magnetorheological material (MRM), the method comprising:
 combining ferromagnetic particles, multiwalled carbon nanotubes (MWNT) and a polymeric material or polymeric material precursor;
 orienting at least one of the MWNT and the ferromagnetic particles; and fusing the polymeric material or polymeric material precursor.

Concept 28. The method of concept 27, wherein fusing comprises polymerizing.

Concept 29. The method of concept 27, wherein fusing comprises solidifying.

Concept 30. The method of concept 29, wherein solidifying occurs by cooling.

Concept 31. The method of concept 28, wherein polymerizing comprises use of an initiator.

Concept 32. The method of concept 28, wherein polymerizing comprises heating.

Concept 33. The method of concept 27, wherein the MWNTs are dispersed in a fluid prior to combining with the polymeric material or polymeric material precursor.

Concept 34. The method of concept 33, wherein the liquid comprises acetone.

Concept 35. The method of concept 27, wherein the orientation comprises applying a magnetic field.

Concept 36. The method of concept 27, further comprising removing a volatile component.

Concept 37. The method of concept 27, further comprising removing a gas.

Concept 38. A method of dampening motion in a structure utilizing the motion damper of concept 14, the method comprising:
controlling the coil to subject the bearing to a varying magnetic field, wherein the variation in the magnetic field is related to the motion that is to be dampened.

Concept 39. The motion damper of concept 14 further comprising a motion sensor and a controller, wherein the motion sensor is in functional communication with the controller and the controller generates a signal for varying a signal to the coil.

Concept 40. A motion damper comprising:
a bearing comprising a magnetorheological material comprising carbon nanotubes;
a first attachment point;
a second attachment point; and
a coil magnetically coupled to the bearing and capable of controllably submitting the bearing to a magnetic field, wherein the first and second attachment points are mechanically attached directly or indirectly to different portions of bearing.

Concept 41. The motion damper of concept 40, wherein the bearing further comprises at least one rigid body.

Concept 42. The motion damper of concept 41, wherein the rigid body is magnetic reactive.

Concept 43. The motion damper of concept 41, wherein the rigid body is a plate.

Concept 44. The motion damper of concept 43, wherein the rigid body is a steel plate.

Concept 45. The motion damper of concept 44, wherein the at least one rigid body comprises a plurality of steel plates.

Concept 46. The motion damper of concept 45, wherein the plurality of steel plates form a laminated structure with the magnetorheological material comprising nanotubes.

Concept 47. The MRM of concept 1, further comprising a second polymeric matrix.

We claim:

1. A magnetorheological material (MRM) comprising:
a polymeric matrix;
ferromagnetic particles embedded in the polymeric matrix; and
carbon nanotubes embedded in the polymeric matrix;
wherein the magnetorheological material is a solid.

2. The MRM of claim 1, wherein the polymeric matrix comprises an elastomer.

3. The MRM of claim 1, wherein the ferromagnetic particles comprise iron.

4. The MRM of claim 1, wherein at least a portion of the ferromagnetic particles are ordered into chains.

5. The MRM of claim 1, wherein at least a portion of the ferromagnetic particles are associated with at least a portion of the carbon nanotubes.

6. The MRM of claim 1, wherein at least a portion of the ferromagnetic particles and the carbon nanotubes form a layered arrangement.

7. The MRM of claim 1, wherein the carbon nanotubes are multiwalled nanotubes (MWNT).

8. The MRM of claim 2, wherein the elastomer comprises a silicone material.

9. A motion damper comprising:
a base;
a bearing comprising a magnetorheological material comprising carbon nanotubes and ferromagnetic particles embedded in a polymeric matrix, the bearing having a first end attached to said base;
a coil coupled to the base and capable of controllably submitting the bearing to a magnetic field, wherein the magnetic field changes at least one viscoelastic property of a component of the bearing; and
an actuation plate attached to a second end of the bearing.

10. The motion damper of claim 9, wherein:
the base comprises a base plate.

11. The motion damper of claim 10, wherein the bearing comprises at least one plate of laminated steel disposed parallel to the base plate; the at least one plate of laminated steel being coated with the magnetorheological material comprising carbon nanotubes.

12. The motion damper of claim 11, wherein said coil comprises a coil wound around a core attached to the base plate and positioned at a central portion of the bearing.

13. The motion damper of claim 11, wherein the damper element comprises at least two plates of steel spaced apart from one another and separated by the magnetorheological material comprising carbon nanotubes.

14. A motion damper comprising:
a bearing comprising a magnetorheological material comprising carbon nanotubes and ferromagnetic particles embedded in a polymeric matrix;
a first attachment point;
a second attachment point; and
a coil magnetically coupled to the bearing and capable of controllably submitting the bearing to a magnetic field, wherein the first and second attachment points are mechanically attached directly or indirectly to different portions of the bearing.

15. The motion damper of claim 14, wherein the bearing further comprises at least one rigid inclusion body.

16. The motion damper of claim 15, wherein the rigid inclusion body is magnetic reactive.

17. The motion damper of claim 15, wherein the rigid inclusion body is a plate.

18. The motion damper of claim 17, wherein the rigid inclusion body is a steel plate.

19. The motion damper of claim 18, wherein the at least one rigid inclusion body comprises a plurality of steel plates.

20. The motion damper of claim 19, wherein the plurality of steel plates form a laminated structure with the magnetorheological material comprising nanotubes.

* * * * *